United States Patent
Casper et al.

(10) Patent No.: US 8,392,619 B2
(45) Date of Patent: Mar. 5, 2013

(54) PROVIDING INDIRECT DATA ADDRESSING IN AN INPUT/OUTPUT PROCESSING SYSTEM WHERE THE INDIRECT DATA ADDRESS LIST IS NON-CONTIGUOUS

(75) Inventors: Daniel F. Casper, Poughkeepsie, NY (US); Mark P. Bendyk, Hyde Park, NY (US); John R. Flanagan, Poughkeepsie, NY (US); Catherine C. Huang, Poughkeepsie, NY (US); Matthew J. Kalos, Tucson, AZ (US); Ugochukwu C. Njoku, Yonkers, NY (US); Dale F. Riedy, Poughkeepsie, NY (US); Gustav E. Sittmann, Webster Groves, MO (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/024,468

(22) Filed: Feb. 10, 2011

(65) Prior Publication Data
US 2011/0131343 A1    Jun. 2, 2011

Related U.S. Application Data

(63) Continuation of application No. 12/031,038, filed on Feb. 14, 2008, now Pat. No. 7,890,668.

(51) Int. Cl.
*G06F 3/00* (2006.01)
(52) U.S. Cl. .................. 710/3; 710/4; 711/1; 711/100; 711/101
(58) Field of Classification Search .................. 710/21, 710/35, 3, 4, 20; 711/1, 100, 101
See application file for complete search history.

(56) References Cited

U.S. PATENT DOCUMENTS

| | | | |
|---|---|---|---|
| 3,693,161 | A | 9/1972 | Price et al. |
| 3,943,283 | A | 3/1976 | Caragliano et al. |
| 4,004,277 | A | 1/1977 | Gavril |
| 4,080,649 | A | 3/1978 | Calle et al. |
| 4,207,609 | A | 6/1980 | Luiz et al. |

(Continued)

FOREIGN PATENT DOCUMENTS

| | | |
|---|---|---|
| DE | 3931514 | 3/1990 |
| GB | 1264096 | 2/1972 |

(Continued)

OTHER PUBLICATIONS

U.S. Appl. No. 12/030,967 Restriction Requirement Mailed Dec. 29, 2009.

(Continued)

*Primary Examiner* — Chun-Kuan Lee
*Assistant Examiner* — Ernest Unelus
(74) *Attorney, Agent, or Firm* — Cantor Colburn LLP; John Campbell

(57) ABSTRACT

Systems, methods and computer program products for providing indirect data addressing at an I/O subsystem of an I/O processing system. The computer program product includes a tangible storage medium readable by a processing circuit and storing instructions for execution by the processing circuit for performing a method. The method includes receiving a control word for an I/O operation. The control word includes an indirect data address for data associated with the I/O operation. The indirect data address includes a starting location of a list of storage addresses that collectively specify the data, the list spans two or more non-contiguous storage locations. Data is gathered responsive to the list. The gathered data is transmitted to a control unit in the I/O processing system.

24 Claims, 11 Drawing Sheets

TCW CHANNEL PROGRAM

U.S. PATENT DOCUMENTS

| | | |
|---|---|---|
| 4,374,415 A | 2/1983 | Cormier et al. |
| 4,380,046 A | 4/1983 | Frosch et al. |
| 4,414,644 A | 11/1983 | Tayler |
| 4,455,605 A | 6/1984 | Cormier et al. |
| 4,497,022 A | 1/1985 | Cormier et al. |
| 4,561,721 A | 12/1985 | Keilmann et al. |
| 4,564,903 A | 1/1986 | Guyette et al. |
| 4,760,518 A | 7/1988 | Potash et al. |
| 4,779,188 A | 10/1988 | Gum et al. |
| 4,837,677 A | 6/1989 | Burrus, Jr. et al. |
| 4,843,541 A | 6/1989 | Bean et al. |
| 4,866,609 A | 9/1989 | Calta et al. |
| 4,870,566 A | 9/1989 | Cooper et al. |
| 5,016,160 A | 5/1991 | Lambeth et al. |
| 5,031,091 A | 7/1991 | Wakatsuki et al. |
| 5,040,108 A | 8/1991 | Kanazawa |
| 5,170,472 A | 12/1992 | Cwiakala et al. |
| 5,185,736 A | 2/1993 | Tyrrell et al. |
| 5,237,325 A | 8/1993 | Klein et al. |
| 5,265,240 A | 11/1993 | Galbraith et al. |
| 5,297,262 A | 3/1994 | Cox et al. |
| 5,301,323 A | 4/1994 | Maeurer et al. |
| 5,317,739 A | 5/1994 | Elko et al. |
| 5,325,492 A | 6/1994 | Bonevento et al. |
| 5,386,512 A | 1/1995 | Crisman et al. |
| 5,388,219 A | 2/1995 | Chan et al. |
| 5,410,727 A | 4/1995 | Jaffe et al. |
| 5,414,851 A | 5/1995 | Brice, Jr. et al. |
| 5,434,980 A | 7/1995 | Casper et al. |
| 5,440,729 A | 8/1995 | Kimura et al. |
| 5,452,455 A | 9/1995 | Brown et al. |
| 5,461,721 A | 10/1995 | Cormier et al. |
| 5,463,736 A | 10/1995 | Elko et al. |
| 5,465,359 A | 11/1995 | Allen et al. |
| 5,500,942 A | 3/1996 | Eickemeyer et al. |
| 5,517,670 A * | 5/1996 | Allen et al. ............... 710/30 |
| 5,526,484 A * | 6/1996 | Casper et al. ............. 709/237 |
| 5,528,755 A | 6/1996 | Beardsley et al. |
| 5,539,918 A | 7/1996 | Allen et al. |
| 5,546,533 A | 8/1996 | Koyama |
| 5,548,791 A | 8/1996 | Casper et al. |
| 5,561,809 A | 10/1996 | Elko et al. |
| 5,564,040 A | 10/1996 | Kubala |
| 5,568,648 A | 10/1996 | Coscarella et al. |
| 5,584,039 A | 12/1996 | Johnson et al. |
| 5,600,793 A | 2/1997 | Nord |
| 5,600,805 A | 2/1997 | Fredericks et al. |
| 5,608,898 A | 3/1997 | Turpin et al. |
| 5,613,163 A | 3/1997 | Marron et al. |
| 5,640,600 A | 6/1997 | Satoh et al. |
| 5,640,603 A | 6/1997 | Meritt et al. |
| 5,644,712 A | 7/1997 | Coscarella et al. |
| 5,671,441 A | 9/1997 | Glassen et al. |
| 5,680,580 A | 10/1997 | Beardsley et al. |
| 5,758,190 A | 5/1998 | Johnson et al. |
| 5,768,620 A | 6/1998 | Johnson et al. |
| 5,787,071 A | 7/1998 | Basso et al. |
| 5,793,983 A | 8/1998 | Albert et al. |
| 5,812,877 A | 9/1998 | Young |
| 5,831,985 A | 11/1998 | Sandorfi |
| 5,845,146 A | 12/1998 | Onodera |
| 5,860,022 A | 1/1999 | Kondou et al. |
| 5,894,583 A | 4/1999 | Johnson et al. |
| 5,901,327 A | 5/1999 | Ofek |
| 5,907,684 A | 5/1999 | Halma et al. |
| 5,918,028 A | 6/1999 | Silverthorn et al. |
| 5,996,026 A | 11/1999 | Onodera et al. |
| 6,125,399 A | 9/2000 | Hamilton |
| 6,125,411 A | 9/2000 | Sato |
| 6,195,330 B1 | 2/2001 | Sawey et al. |
| 6,202,095 B1 | 3/2001 | Beardsley et al. |
| 6,230,218 B1 | 5/2001 | Casper et al. |
| 6,249,787 B1 | 6/2001 | Schleimer et al. |
| 6,263,380 B1 | 7/2001 | Tsuboi et al. |
| 6,338,105 B1 | 1/2002 | Niizuma et al. |
| 6,343,335 B1 | 1/2002 | Dahman et al. |
| 6,347,334 B1 | 2/2002 | Fredericks et al. |
| 6,351,779 B1 | 2/2002 | Berg et al. |
| 6,353,612 B1 | 3/2002 | Zhu et al. |
| 6,401,223 B1 | 6/2002 | DePenning |
| 6,460,087 B1 | 10/2002 | Saito et al. |
| 6,466,590 B1 | 10/2002 | Park et al. |
| 6,484,217 B1 | 11/2002 | Fuente et al. |
| 6,546,435 B1 | 4/2003 | Yoshimura et al. |
| 6,584,511 B1 | 6/2003 | Marsh, III et al. |
| 6,594,785 B1 | 7/2003 | Gilbertson et al. |
| 6,609,161 B1 | 8/2003 | Young |
| 6,609,165 B1 | 8/2003 | Frazier |
| 6,647,016 B1 | 11/2003 | Isoda et al. |
| 6,651,125 B2 | 11/2003 | Maergner et al. |
| 6,654,954 B1 | 11/2003 | Hicks |
| 6,658,603 B1 | 12/2003 | Ward |
| 6,687,766 B1 | 2/2004 | Casper et al. |
| 6,693,880 B2 | 2/2004 | Gregg et al. |
| 6,694,390 B1 | 2/2004 | Bogin et al. |
| 6,751,680 B2 | 6/2004 | Langerman et al. |
| 6,751,683 B1 | 6/2004 | Johnson et al. |
| 6,769,009 B1 | 7/2004 | Reisman |
| 6,772,207 B1 | 8/2004 | Dorn et al. |
| 6,826,661 B2 | 11/2004 | Umbehocker et al. |
| 6,839,773 B2 | 1/2005 | Vishlitzky et al. |
| 6,862,322 B1 | 3/2005 | Ewen et al. |
| 6,898,202 B2 | 5/2005 | Gallagher et al. |
| 6,915,378 B2 | 7/2005 | Roberti |
| 6,950,888 B1 | 9/2005 | Rooney et al. |
| 6,963,940 B1 | 11/2005 | Glassen et al. |
| 7,000,036 B2 | 2/2006 | Carlson et al. |
| 7,003,700 B2 | 2/2006 | Elko et al. |
| 7,020,810 B2 | 3/2006 | Holman |
| 7,035,540 B2 | 4/2006 | Finan et al. |
| 7,058,735 B2 | 6/2006 | Spencer |
| 7,085,860 B2 | 8/2006 | Dugan et al. |
| 7,100,096 B2 | 8/2006 | Webb, Jr. et al. |
| 7,111,130 B2 | 9/2006 | Blake et al. |
| 7,120,728 B2 | 10/2006 | Krakirian et al. |
| 7,124,207 B1 | 10/2006 | Lee et al. |
| 7,133,988 B2 | 11/2006 | Fujibayashi |
| 7,149,823 B2 | 12/2006 | Miller et al. |
| 7,155,569 B2 * | 12/2006 | Johnson et al. ............... 711/114 |
| 7,164,425 B2 | 1/2007 | Kwak et al. |
| 7,174,274 B2 | 2/2007 | Carlson et al. |
| 7,202,801 B2 | 4/2007 | Chou |
| 7,277,387 B2 | 10/2007 | Sanders et al. |
| 7,292,597 B2 | 11/2007 | Mills et al. |
| 7,315,911 B2 | 1/2008 | Davies et al. |
| 7,373,435 B2 | 5/2008 | Carlson et al. |
| 7,382,733 B2 | 6/2008 | Banerjee et al. |
| 7,395,284 B2 | 7/2008 | Sato et al. |
| 7,398,335 B2 | 7/2008 | Sonksen et al. |
| 7,484,021 B2 | 1/2009 | Rastogi et al. |
| 7,500,023 B2 | 3/2009 | Casper et al. |
| 7,500,030 B2 | 3/2009 | Hathorn et al. |
| 7,502,873 B2 | 3/2009 | Casper et al. |
| 7,512,133 B2 | 3/2009 | Dugan et al. |
| 7,516,248 B2 | 4/2009 | Carlson et al. |
| 7,539,777 B1 | 5/2009 | Aitken |
| 7,543,087 B2 | 6/2009 | Philbrick et al. |
| 7,555,554 B2 | 6/2009 | Manders et al. |
| 7,558,827 B2 | 7/2009 | Kawashima et al. |
| 7,564,791 B2 | 7/2009 | Jayakrishnan et al. |
| 7,577,772 B2 | 8/2009 | Sonksen et al. |
| 7,577,773 B1 | 8/2009 | Gandhi et al. |
| 7,594,057 B1 | 9/2009 | Gandhi et al. |
| 7,599,360 B2 | 10/2009 | Edsall et al. |
| 7,600,053 B2 | 10/2009 | Carlson et al. |
| 7,711,871 B1 | 5/2010 | Haechten et al. |
| 7,743,197 B2 | 6/2010 | Chavan et al. |
| 7,765,336 B2 | 7/2010 | Butler et al. |
| 7,826,349 B2 | 11/2010 | Kaur et al. |
| 7,840,717 B2 | 11/2010 | Flanagan et al. |
| 7,840,718 B2 | 11/2010 | Ricci et al. |
| 7,840,719 B2 | 11/2010 | Casper et al. |
| 7,856,511 B2 | 12/2010 | Ricci et al. |
| 7,941,570 B2 | 5/2011 | Flanagan et al. |
| 2001/0030943 A1 | 10/2001 | Gregg et al. |
| 2002/0032810 A1 | 3/2002 | Wagner |
| 2002/0062407 A1 | 5/2002 | Tateyama et al. |

| | | |
|---|---|---|
| 2002/0099967 A1 | 7/2002 | Kawaguchi |
| 2002/0152338 A1 | 10/2002 | Elliott et al. |
| 2002/0178404 A1 | 11/2002 | Austen et al. |
| 2003/0002492 A1 | 1/2003 | Gallagher et al. |
| 2003/0056000 A1 | 3/2003 | Mullendore et al. |
| 2003/0084213 A1 | 5/2003 | Brice, Jr. et al. |
| 2003/0103504 A1 | 6/2003 | Dugan et al. |
| 2003/0158998 A1 | 8/2003 | Smith |
| 2003/0187627 A1 | 10/2003 | Hild et al. |
| 2003/0188053 A1 | 10/2003 | Tsai |
| 2003/0208581 A1 | 11/2003 | Behren et al. |
| 2004/0030822 A1 | 2/2004 | Rajan et al. |
| 2004/0054776 A1 | 3/2004 | Klotz et al. |
| 2004/0113772 A1 | 6/2004 | Hong Chou |
| 2004/0125960 A1 | 7/2004 | Fosgate et al. |
| 2004/0136241 A1 | 7/2004 | Rapp et al. |
| 2004/0151160 A1 | 8/2004 | Sanders et al. |
| 2004/0193968 A1 | 9/2004 | Dugan et al. |
| 2004/0210719 A1 | 10/2004 | Bushey et al. |
| 2004/0230706 A1 | 11/2004 | Carlson et al. |
| 2004/0260851 A1 | 12/2004 | Tu |
| 2005/0018673 A1 | 1/2005 | Dropps et al. |
| 2005/0102456 A1 | 5/2005 | Kang |
| 2005/0105456 A1 | 5/2005 | Cookson et al. |
| 2005/0108251 A1 | 5/2005 | Hunt |
| 2005/0175341 A1 | 8/2005 | Ovadia |
| 2005/0193029 A1 | 9/2005 | Rom et al. |
| 2005/0204069 A1 | 9/2005 | Carlson et al. |
| 2005/0216617 A1 | 9/2005 | Carlson et al. |
| 2005/0223291 A1 | 10/2005 | Zimmer et al. |
| 2005/0229033 A1 | 10/2005 | Tanaka et al. |
| 2005/0257118 A1 | 11/2005 | Shien |
| 2006/0036769 A1 | 2/2006 | Frey et al. |
| 2006/0050726 A1 | 3/2006 | Ahmed et al. |
| 2006/0075154 A1 | 4/2006 | Carlson et al. |
| 2006/0085595 A1 | 4/2006 | Slater |
| 2006/0159112 A1 | 7/2006 | Sundaram et al. |
| 2006/0224795 A1 | 10/2006 | Muto et al. |
| 2007/0005838 A1 | 1/2007 | Chang et al. |
| 2007/0016554 A1 | 1/2007 | Dapp et al. |
| 2007/0061463 A1 | 3/2007 | Hiramatsu et al. |
| 2007/0072543 A1 | 3/2007 | Paila et al. |
| 2007/0079022 A1 | 4/2007 | Carlson et al. |
| 2007/0079051 A1 | 4/2007 | Tanaka et al. |
| 2007/0091497 A1 | 4/2007 | Mizuno et al. |
| 2007/0162631 A1 | 7/2007 | Balakrishnan et al. |
| 2007/0174544 A1 | 7/2007 | Yasuda et al. |
| 2007/0239944 A1 | 10/2007 | Rupanagunta et al. |
| 2007/0294697 A1 | 12/2007 | Theimer et al. |
| 2008/0040519 A1 | 2/2008 | Starr et al. |
| 2008/0043563 A1 | 2/2008 | Brice et al. |
| 2008/0059638 A1 | 3/2008 | Hathorn et al. |
| 2008/0103754 A1 | 5/2008 | Carlson et al. |
| 2008/0103755 A1 | 5/2008 | Carlson et al. |
| 2008/0109580 A1 | 5/2008 | Carlson et al. |
| 2008/0147889 A1 | 6/2008 | Casper et al. |
| 2008/0147890 A1 | 6/2008 | Casper et al. |
| 2008/0183877 A1 | 7/2008 | Carlson et al. |
| 2008/0235553 A1 | 9/2008 | Chintada et al. |
| 2008/0256264 A1 | 10/2008 | Muto et al. |
| 2008/0273518 A1 | 11/2008 | Pratt et al. |
| 2008/0307122 A1 | 12/2008 | Butler et al. |
| 2009/0049241 A1 | 2/2009 | Ohno et al. |
| 2009/0055585 A1 | 2/2009 | Fernandes et al. |
| 2009/0144586 A1 | 6/2009 | Casper et al. |
| 2009/0172203 A1 | 7/2009 | Casper et al. |
| 2009/0210557 A1 | 8/2009 | Gainey, Jr. et al. |
| 2009/0210559 A1 | 8/2009 | Flanagan et al. |
| 2009/0210560 A1 | 8/2009 | Yudenfriend et al. |
| 2009/0210561 A1 | 8/2009 | Ricci et al. |
| 2009/0210562 A1 | 8/2009 | Huang et al. |
| 2009/0210563 A1 | 8/2009 | Flanagan et al. |
| 2009/0210564 A1 | 8/2009 | Ricci et al. |
| 2009/0210570 A1 | 8/2009 | Bendyk et al. |
| 2009/0210571 A1 | 8/2009 | Casper et al. |
| 2009/0210572 A1 | 8/2009 | Yudenfriend et al. |
| 2009/0210573 A1 | 8/2009 | Yudenfriend et al. |
| 2009/0210576 A1 | 8/2009 | Casper et al. |
| 2009/0210579 A1 | 8/2009 | Bendyk et al. |
| 2009/0210580 A1 | 8/2009 | Bendyk et al. |
| 2009/0210581 A1 | 8/2009 | Flanagan et al. |
| 2009/0210582 A1 | 8/2009 | Bendyk et al. |
| 2009/0210583 A1 | 8/2009 | Bendyk et al. |
| 2009/0210584 A1 | 8/2009 | Carlson et al. |
| 2009/0210585 A1 | 8/2009 | Ricci et al. |
| 2009/0210768 A1 | 8/2009 | Carlson et al. |
| 2009/0210769 A1 | 8/2009 | Casper et al. |
| 2009/0210884 A1 | 8/2009 | Ricci et al. |
| 2009/0307388 A1 | 12/2009 | Tchapda |
| 2010/0014526 A1 | 1/2010 | Chavan et al. |
| 2010/0030919 A1 | 2/2010 | Flanagan et al. |
| 2010/0030920 A1 | 2/2010 | Casper et al. |
| 2010/0064072 A1 | 3/2010 | Tang et al. |
| 2010/0299460 A1* | 11/2010 | Wang .............................. 710/52 |

FOREIGN PATENT DOCUMENTS

| | | |
|---|---|---|
| GB | 2291990 A | 9/1995 |
| GB | 2291990 | 2/1996 |
| JP | 63236152 | 10/1988 |
| JP | 2010-140127 A | 6/2010 |
| WO | 2006102664 A2 | 9/2006 |

OTHER PUBLICATIONS

ANSI INCITS 433-2007, Information Technology Fibre Channel Link Services (FC-LS), Jul. 2007.

Behrs, Jr, "Adaptive Prediction Minimizes Data Overrun and Underrun", IBM, Nov. 1994, pp. 1-3. http://priorartdatabase.com/IPCOM/000114189.

Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.

Meritt, A.S. and J.H. Sorg, "Correction of Channel Measurement Data Caused by Control Unit Queuing," IBM Technical Disclosure Bulletin, vol. 33, No. 11, Apr. 1991, pp. 100-103.

Dauby, et al. "Contention Resolution Between Two Processors"; IBM Technical Disclosure Bulletin; vol. 26; No. 10A; Mar. 1984; 3 pages.

DeVeer, J.A.; "Control Frame Multiplexing on Serial I/O Channels"; IBM Technical Disclosure Bulletin; vol. 32; No. 10A; Mar. 1990; pp. 39-40.

Fibre Channel Single Byte Command Code Sets-2 Mapping Protocol (FC-SB-3), T11/Project 1357-D/Rev 1.6, INCITS Mar. 2003.

"Information Technology-Fibre Channel Protocol for SCSI, Third Version (FCP-3)," T10 Project 1560-D, Revision 4g, Sep. 13, 2005.

U.S. Appl. No. 12/031,038 Non-Final Office Action dated Nov. 16, 2009.

U.S. Appl. No. 12/030,912 Non-Final Office Action dated Mar. 18, 2010.

U.S. Appl. No. 12/030,920 Non-Final Office Action dated Feb. 23, 2010.

U.S. Appl. No. 12/030,975 Non-Final Office Action dated Oct. 22, 2009.

U.S. Appl. No. 12/030,932 Non-Final Office Action dated Dec. 16, 2009.

U.S. Appl. No. 12/031,023 Non-Final Office Action dated Oct. 29, 2009.

U.S. Appl. No. 12/030951 Non-Final Office Action dated May 20, 2010.

U.S. Appl. No. 12/030,951 Non-Final Office Action dated Nov. 23, 2009.

U.S. Appl. No. 12/030,961 Non-Final Office Action dated Dec. 17, 2009.

U.S. Appl. No. 12/030,939 Non-Final Office Action dated Nov. 16, 2009.

U.S. Appl. No. 12/030,989 Non-Final Office Action dated Oct. 22, 2009.

U.S. Appl. No. 12/030,993 Non-Final Office Action dated Oct. 28, 2009.

U.S. Appl. No. 12/031,021 Non-Final Office Action dated Jan. 8, 2010.

U.S. Appl. No. 12/181,662—Non-Final Office Action dated Jun. 18, 2009.

U.S. Appl. No. 12/181,662—Final Office Action dated Jan. 4, 2010.
U.S. Appl. No. 12/031,038, Notice of Allowance Mailed Oct. 6, 2010.
U.S. Appl. No. 12/031,038, Non-Final Office Action Mailed Apr. 15, 2010.
U.S. Appl. No. 12/030,912; Final Office Action; mailed Oct. 6, 2010.
U.S. Appl. No. 12/031,182 Final Office Action Mailed Jul. 22, 2010.
U.S. Appl. No. 12/031,182, Non Final Office Action Mailed Dec. 23, 2010.
U.S. Appl. No. 12/030,920, Notice of Allowance Mailed Dec. 28, 2010.
U.S. Appl. No. 12/030,920 Notice of Allowance Mailed Aug. 23, 2010.
U.S. Appl. No. 12/030,954 Non-Final Office Action dated Jan. 21, 2010.
U.S. Appl. No. 12/030,954, Notice of Allowance mailed Dec. 28, 2010.
U.S. Appl. No. 12/030,975. Final Office Action Mailed May 13, 2010.
U.S. Appl. No. 12/030,975, Notice of Allowance Mailed Oct. 19, 2010.
U.S. Appl. No. 12/030,932, Final Office Action Mailed Jul. 23, 2010.
U.S. Appl. No. 12/030,932, Non-Final Office Action Mailed Dec. 16, 2010.
U.S. Appl. No. 12/031,023, Final Office Action Mailed Nov. 18, 2010.
U.S. Appl. No. 12/030,951, Final Office Action Mailed Oct. 26, 2010.
U.S. Appl. No. 12/030,961 Notice of Allowance Mailed Nov. 5, 2010.
U.S. Appl. No. 12/030,967 Notice of Allowance Mailed Oct. 7, 2010.
U.S. Appl. No. 12/030,967, Notice of Allowance mailed Apr. 23, 2010.
U.S. Appl. No. 12/031,201, Final Office Action Mailed Aug. 3, 2010.
U.S. Appl. No. 12/031,201, Non-Final Office Action Mailed Dec. 27, 2011.
U.S. Appl. No. 12/0303,985, Non Final Office Action Mailed May 5, 2010.
U.S. Appl. No. 12/030,985, Notice of Allowance mailed Nov. 24, 2010.
U.S. Appl. No. 12/030,993, Final Office Action Mailed Dec. 10, 2010.
U.S. Appl. No. 12/031,042, Final Office Action Mailed Oct. 25, 2010.
U.S. Appl. No. 12/031,042, Non-Final Office Action Mailed Apr. 5, 2010.
U.S. Appl. No. 12/031,021, Notice of Allowance Mailed Apr. 30, 2010.
U.S. Appl. No. 12/181,662, Notice of Allowance Mailed Aug. 4, 2010.
U.S. Appl. No. 12/364,615, Non Final Office Action Mailed Oct. 7, 2010.
U.S. Appl. No. 12/364615, Notice of Allowance Mailed Mar. 10, 2011.
U.S. Appl. No. 12/183,305, Non-Final Office Action Mailed May 11, 2010.
U.S. Appl. No. 12/183,305, Notice of Allowance Mailed Nov. 1, 2010.
U.S. Appl. No. 12/183,315, Notice of Allowance Mailed Dec. 13, 2010.
U.S. Appl. No. 12/183,315 Notice of Allowance dated Sep. 15, 2010.
U.S. Appl. No. 12/183,323, Non-Final Office Action Mailed Jan. 3, 2011.
IBM, "Method and Apparatus to Monitor PAV Utilization", Feb. 2005, pp. 1-3. http://priorartdatabase.com/IPCOM/000082878.
IBM® z/Architecture Principles of Operation, Publication No. SA22-7832-05, 6th Edition, Apr. 2007. 1,215 pages separated into 4 electronic attachments_Part 1.
IBM® z/Architecture Principles of Operation, Publication No. SA22-7832-05, 6th Edition, Apr. 2007. 1,215 pages separated into 4 electronic attachments. Part 2.
IBM® z/Architecture Principles of Operation, Publication No. SA22-7832-05, 6th Edition, Apr. 2007. 1,215 pages separated into 4 electronic attachments. Part 3.
IBM® z/Architecture Principles of Operation, Publication No. SA22-7832-05, 6th Edition, Apr. 2007. 1,215 pages separated into 4 electronic attachments. Part 4.

Z/Series Input/Output Configuration Program user•s Guide for IYP 10CP, SB10-7029-03c. International Business Machines Corporation, Jun. 2003.
Iren, et al.; "The Transport Layer: Tutorial and Survey"; ACM Computing Surveys; vol. 31, No. 4; Dec. 1999; pp. 360-405.
Ishikawa, Hikaru, et al. "Bi-Directional OFDM Transmission using Adaptive Modulation that spreads Data Symbols". Power Line Communications and its Applications, 2006, IEEE International Symposium on, vol., No., pp. 202-207.
International Search Report and Written Opinion for PCT/EP2009/051447 dated Jul. 1, 2009.
International Search Report and Written Opinion for PCT/EP2009/051483 dated Jul. 27, 2009.
Written Opinion and International Search Report for PCT/EP2009/051445 dated Jun. 25, 2009.
Written Opinion and International Search Report for PCT/EP2009/051446 dated Jun. 25, 2009.
Written Opinion and International Search Report for PCT/EP2009/051461 dated Sep. 22, 2009.
Written Opinion and International Search Report for PCT/EP2009/051462 dated Jul. 1, 2009.
Written Opinion and International Search Report for PCT/EP2009/051450 dated Jul. 7, 2009.
Written Opinion and International Search Report for PCT/EP2009/051459 dated Jun. 23, 2009.
Written Opinion and International Search Report for PCT/EP2009/051463 dated Jul. 22, 2009.
Moore et al., Reconfiguration of Storage Elements to Improve Performance, IBM, Dec. 1983, pp. 1-3. http://priorartdatabas.com/IPCOM/000047719.
Nordstrom.; "Sequence Reception Method for a Fibre Channel Protocol Chip"; IBM Technical Disclosure Bulletin; vol. 38, No. 12; Dec. 1995; pp. 267-269.
Peterson; "Information Techonology, Fibre Channel Protocol for SCSI, Fourth Version (FCP-3)", Draft Proposed American National Standard, Jun. 2004; pp. 1-142.
Patent No. 7,000,036 Notice of Allowance dated Feb. 3, 2006.
Patent No. 7,000,036 Non-Final Office Action dated Jul. 15, 2005.
Patent No. 7,174,274 Non-Final Office Action dated Jun. 8, 2006.
Patent No. 7,174,274 Non-Final Office Action dated Jun. 21, 2006.
Patent No. 7,174,274 Notice of Allowance Sep. 13, 2007.
Patent No. 7,174,274 Notice of Allowance Dec. 27, 2006.
U.S. Appl. No. 11/126,728 Non-Final Office Action Apr. 16, 2007.
Patent No. 7,373,435 Non-Final Office Action Jun. 11, 2007.
Patent No. 7,373, 435 Non-Final Office Action Sep. 13, 2007.
Patent No. 7,373,435 Notice of Allowance dated Apr. 30, 2008.
U.S. Appl. No. 11/469,573 Non-Final Office Action dated Apr. 11, 2008.
Patent No. 7,600,053 Non-Final Office Action dated Mar. 17, 2009.
Patent No. 7,600,053 Notice of Allowance dated Aug. 26, 2009.
U.S. Appl. No. 11/965866 Non-Final Office Action dated Jun. 3, 2010.
Patent No. 7,516,248 Notice of Allowance Feb. 20, 2009.
U.S. Appl. No. 11/548,060 Non-Final Office Action dated Apr. 15, 2008.
U.S. Appl. No. 11/548,093 Non-Final Office Action dated Apr. 17, 2008.
U.S. Appl. No. 12/031,182 Non-Final Office Action dated Jan. 22, 2010.
U.S. Appl. No. 12/031,201 Non-Final Office Action dated Jan. 25, 2010.
U.S. Appl. No. 12/030,989 Final Office Action dated May 24, 2010.
U.S. Appl. No. 12/183,315, Notice of Allowance Mailed on Jun. 15, 2010.
International Search Report; International Application No. PCT/EP2009/059184; International Filing Date: Jul. 16, 2009; Date of mailing: Jan. 14, 2010; 9 pages.
U.S. Appl. No. 12/031,201 Final Office Action dated Jun. 13, 2011.
U.S. Appl. No. 12/946,514, Non-Final Office Action Mailed Jun. 23, 2011.
U.S. Appl. No. 12/183,323, Notice of Allowance Mailed Jun. 23, 2011.

U.S. Appl. No. 12/030,912 Non Final Office Action Mailed Aug. 18, 2011.
U.S. Appl. No. 12/031,182 Final Office Action dated Oct. 20, 2011.
U.S. Appl. No. 12/030,925, Notice of Allowance Mailed Sep. 7, 2011.
U.S. Appl. No. 12/030,932, Notice of Allowance mailed Nov. 1, 2011.
U.S. Appl. No. 12/030.981 Non Final Office Action Mailed Aug. 2, 2011.
POU920070218US1, U.S. Appl. No. 12/030,938, Notice of Allowance Mailed Aug. 8, 2011.
POU920080042US1, U.S. Appl. No. 12/030,989, Notice of Allowance Mailed Aug. 5, 2011.
U.S. Appl. No. 12/031,042, Non-Final Office Action Mailed Sep. 30, 2011.
U.S. Appl. No. 12/183,315, filed Jul. 31, 2008.
"Protocol for Insochronous Traffic Over Fiber Channel Switching"; IBM Technical Disclosure Bulletin; vol. 37, No. 06B; Jun. 1994. pp. 377-380.
Golasky, Richard; "Link-Level Error Recovery With Tape Backup"; Dell Power Solutions; Aug. 2005; pp. 88-91.
Z/Architecture Principles of Operation SA 22/7832-01 International Business Machines Corporation, 2nd Edition, Oct. 2001.
Sachs, M.W.; "I/O Marker Changing"; IBM Technical Disclosure Bulletin; vol. 37, No. 02A; Feb. 1994; pp. 75-76.
SCSI Primary Commands—4 (SPC-4); Project T10/1731-D. Rev 11. INCITS Apr. 14, 2010.
Simmons et al.; "A Performance Comparison of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.
Snively, et al.; "Fibre Channel, Framing and Signaling"; (FC-FS) Rev. 1.70; NCITS Working Draft Proposed American National Standard for Information Technology; Feb. 2002; pp. i-575.
Snively et al.; Fibre Channel Single Byte Command Code Sets-3 Mapping Protocol (FC-SB-3); T11/Project 1357-D/Rev. 1.6, INCITS; Mar. 2003; pp. 1-206.
Srikrishnan et al.; "Sharing FCP Adapters Through Virtualization"; IBM J. Res. & Dev., vol. 51, No. 1/2; Jan./Mar. 2007; pp. 103-118.
Stone, et al.; "When the CRC and TCP Checksum Disagree"; SIGCOMM '00, Stockholm, Sweden; Jul. 2000; 10 pages.
Laudon et al. •System Overview of the SGI Origin 200/2000 Product Line, 1997, iEEE Publication pp. 150-156.
Tachikawa, T., et al. "ARQ protocols for bi-directional data transmission," Information Networking, 1998 (ICOIN-12) Proceedings., Twelfth International Conference on., vol., No., pp. 468-473, Jan. 21-23, 1998.
U.S. Appl. No. 12/183,323, filed Jul. 31, 2008.
U.S. Appl. No. 12/030,939 Notice of Alllowance mailed Jun. 29, 2010.
U.S. Appl. No. 12/030,954 Non Final Office Action mailed Jul. 12, 2010.
U.S. Appl. No. 12/030,961 Final Office Action mailed Jul. 12, 2010.
U.S. Appl. No. 12/030,993 Non Final Office Action mailed Jun. 28, 2010.
U.S. Appl. No. 12/031,021 Notice of Allowance mailed Jul. 8, 2010.
U.S. Appl. No. 12/031,023 Non Final Office Action mailed Jun. 11, 2010.
U.S. Appl. No. 12/183,323 Non Final Office Action mailed Jul. 19, 2010.
U.S. Appl. No. 12/392,246 Notice of Allowance mailed Jul. 15, 2010.
U.S. Appl. No. 12/183,305 filed on Jul. 31, 2008.
"z/Architecture-Principles of Operation," IBM Publication No. SA22-7832-04, 5th Ed., Sep. 2005.
Aboda, B.-et al.; Network Working Group; "Securing Block Storage Protocols Over IP"; ACM Digital Library; RFC3723; Apr. 2004.
Azimi, R.-et al.; "miNI: Reducing Network Interface Memory Requirements with Dynamic Handle Lookup"; ACM Digital Library; pp. 261-272; Jun. 2003.
Emulex Corporation; "Install the LP850 Host Adapter"; Google/Emulex Corporation, LightPulse LP850 Fibre Channel PCI Host Adapter Manuals; pp. 1-10, 1999.
Foong, A.-et al.; "Towards SSD-Ready Enterprise Platforms"; Google/Intel Corporation; 2008-2009.
Hewlett-Packard Company; HP A4800A PCI FWD SCSI Host Bus Adapter—Service & User Guide, Edition 6; Google/H-P; 2001.
Hewlett-Packard Company; "HP A5149 PCI Ultra2 SCSI Host Bus Adapter—Service and User Guide", Edition 2; Google/H-P; 2001.
POU920070301US1, U.S. Appl. No. 12/030,951, Notice of Allowance Mailed Apr. 4, 2011.
U.S. Appl. No. 12/364,615, Notice of Allowance Mailed Mar. 10, 2011.
Jiang, J.-et al.; "The Role of FCoE in I/O Consolidation"; ACM Digital Library/International Conf on Advanced Infocomm Technology '08; Jul. 2008.
Josephson, WK.-et al.; "DFS: A File System for Virtualized Flash Storage"; ACM Digital Library; vol. 6, No. 3, Article 14, Sep. 2010.
LSI Corporation; "PCI Express to 6Gb/s SAS Host Bus Adapters"; Google; Chapter 1, Introduction/Overview; LSI User Guide; Oct. 2009.
LSI; "ScsiPortGetDeivceBase"; Google/LSI; Apr. 2003.
Magoutis, K.; "The Optimistic Direct Access File System: Design and Network Interface Support"; Division of Engineering & Applied Science, Harvard Univ.; Feb. 2002.
Miller, DJ.-et al.; "Motivating Future Interconnects: A Differential Measurement Analysis of PCI Latency"; ACM Digital Library; pp. 94-105; Oct. 2009.
Network Storage Systems; Google; Oct. 2007.
Sun, Oracle; "Sun Storage 6 Gb SAS PCIe HBA, External-Installation Guide for HBA Models"; Google; Revision A; Nov. 2010.
Petersen, MK.-et al.; "DIF/DIX Aware Linux SCSI HBA Interface"; Google; Oracle Linux Engineering; Jul. 2008.
Satran, J.-et al.; Network Working Group; "Internet Small Computer Systems Interface (iSCSI)"; ACM Digital Library; RFC3720; Apr. 2004.
Vaghani, SB.; "Virtual Machine File System"; VMWare Inc./ACM Digital Library; pp. 57-69; 2008-2009.
U.S. Appl. No. 12/030,912, Final Office Action Mailed Feb. 27, 2012.
U.S. Appl. No. 12/031,182 Non-Final Office Action dated Mar., 16, 2012.
U.S. Appl. No. 13/351,073, Non Final Office Action Mailed Mar. 30, 2012.
U.S. Appl. No. 12/031,042, Notice of Allowance Mailed Feb. 29, 2012.
U.S. Appl. No. 13/150,539, Non-Final Office Action Mailed Mar. 2, 2012.
URL, http://en.wikipedia.org/wiki/FICON, FICON, Wikipedia, USA, Wikimedia Foundation, Inc., Aug. 9, 2011.
U.S. Appl. No. 13/075,993, Final Office Action Mailed Feb. 13, 2012.
U.S. Appl. No. 12/030,981, Notice of Allowance mailed Jan. 27, 2012.
U.S. Appl. No. 12/031,023, Non-Final Office Action Mailed Feb. 1, 2012.
U.S. Appl. No. 12/030,993 Notice of Allowance Mailed Dec. 22, 2011.
U.S. Appl. No. 13/150,583, Non-Final Office Action Mailed Feb. 3, 2012.
U.S. Appl. No. 13/173,733, Non-Final Office Action Mailed Feb. 7, 2012.
U.S. Appl. No. 13/173,772 Non Final Office Action Mailed Feb. 3, 2012.

* cited by examiner

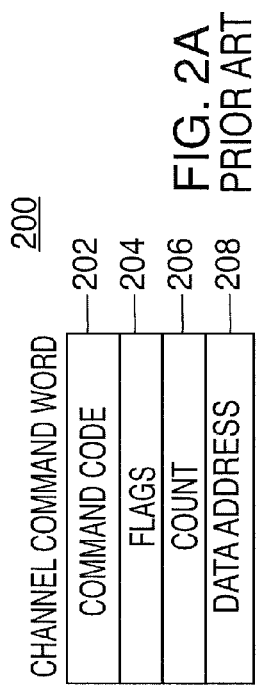
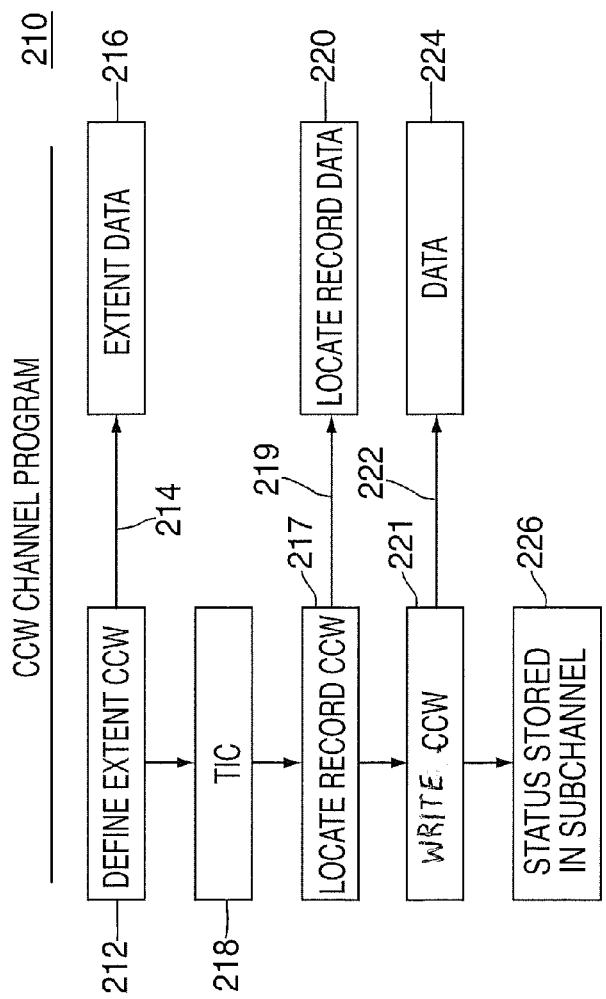

PROVIDING INDIRECT DATA ADDRESSING IN AN INPUT/OUTPUT PROCESSING SYSTEM WHERE THE INDIRECT DATA ADDRESS LIST IS NON-CONTIGUOUS

CROSS REFERENCE TO RELATED APPLICATIONS

This application is a continuation of U.S. patent application Ser. No. 12/031,038 filed Feb. 14, 2008, the entire disclosure of which is incorporated herein by reference.

BACKGROUND OF THE INVENTION

1. Field of the Invention

The present disclosure relates generally to input/output processing, and in particular, to providing a non-contiguous indirect data addressing list at an I/O subsystem of an I/O processing system.

2. Description of Background

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem may employ channel command words (CCWs) to transfer data between the I/O devices and memory. A CCW specifies the command to be executed. For commands initiating certain I/O operations, the CCW designates the memory area associated with the operation, the action to be taken whenever a transfer to or from the area is completed, and other options.

During I/O processing, a list of CCWs is fetched from memory by a channel. The channel parses each command from the list of CCWs and forwards a number of the commands, each command in its own entity, to a control unit coupled to the channel. The control unit then processes the commands. The channel tracks the state of each command and controls when the next set of commands are to be sent to the control unit for processing. The channel ensures that each command is sent to the control unit in its own entity. Further, the channel infers certain information associated with processing the response from the control unit for each command.

Performing I/O processing on a per CCW basis may involve a large amount of processing overhead for the channel subsystem, as the channels parse CCWs, track state information, and react to responses from the control units. Therefore, it may be beneficial to shift much of the processing burden associated with interpreting and managing CCW and state information from the channel subsystem to the control units. Simplifying the role of channels in communicating between the control units and an operating system in the I/O processing system may increase communication throughput as less handshaking is performed. However, altering command sequences, as well as roles of the channel subsystem and the control units, allows the amount of data that is transferred within a single I/O operation to more than one megabyte. This is the maximum amount of data that can be transferred with one continuous list of transport indirect data addresses when the system page size is 4k bytes. Currently, an existing Channel Command Word (CCW) cannot support a data transfer of more than 64k bytes within a single I/O operation because of the limitation of the two byte count field in the CCW. The Transport Control Word (TCW) solved that problem by increasing the byte count to four bytes in the TCW, but then the next limitation of one megabyte was encountered because the transport indirect data address list (TIDAL) must be contained in one page which is 4k bytes which only allowed 256 address list entries.

BRIEF SUMMARY OF THE INVENTION

Embodiments of the invention include a computer program product for providing indirect data addressing at an input/output (I/O) subsystem of an I/O processing system. The computer program product includes a tangible storage medium readable by a processing circuit and storing instructions for execution by the processing circuit for performing a method. The method includes receiving a control word for an I/O operation. The control word includes an indirect data address for data associated with the I/O operation. The indirect data address includes a starting location of a list of storage addresses that collectively specify the data, the list spans two or more non-contiguous storage locations. Data is gathered responsive to the list. The gathered data is transmitted to a control unit in the I/O processing system.

Additional embodiments include an apparatus for providing indirect data addressing at an I/O subsystem of an I/O processing system. The apparatus includes an I/O subsystem adapted to communicate with a control unit in the I/O processing system. The I/O subsystem performs a method including receiving a control word for an I/O operation. The control word includes an indirect data address for data associated with the I/O operation. The indirect data address includes a starting location of a list of storage addresses that collectively specify the data, the list spans two or more non-contiguous storage locations. Data is gathered responsive to the list. The gathered data is transmitted to the control unit.

Further embodiments include a method for providing indirect data addressing at an I/O subsystem of an I/O processing system. The method includes receiving a control word for an I/O operation. The control word includes an indirect data address for data associated with the I/O operation. The indirect data address includes a starting location of a list of storage addresses that collectively specify the data, the list spans two or more non-contiguous storage locations. Data is gathered responsive to the list. The gathered data is transmitted to a control unit in the I/O processing system.

Still further embodiments include a computer program product for providing indirect data addressing at an I/O subsystem of an I/O processing system. The computer program product includes a tangible storage medium readable by a processing circuit and storing instructions for execution by the processing circuit for performing a method. The method includes receiving a control word for an I/O operation. The control word includes an indirect data address for customer data output from the I/O operation. The indirect data address includes a starting location of a list of storage addresses that collectively specify a storage location for the customer data output, the list spans two or more non-contiguous storage locations. Customer data output is received from a control unit in the I/O processing system in response to the I/O operation being executed at the control unit. The customer data output is stored at the storage location at the I/O subsystem responsive to the list.

Other articles of manufacture, apparatuses, and/or methods according to embodiments will be or become apparent to one with skill in the art upon review of the following drawings and detailed description. It is intended that all such additional articles of manufacture, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2A depicts one example of a prior art channel command word;

FIG. 2B depicts one example of a prior art channel command word channel program;

Figure 1:
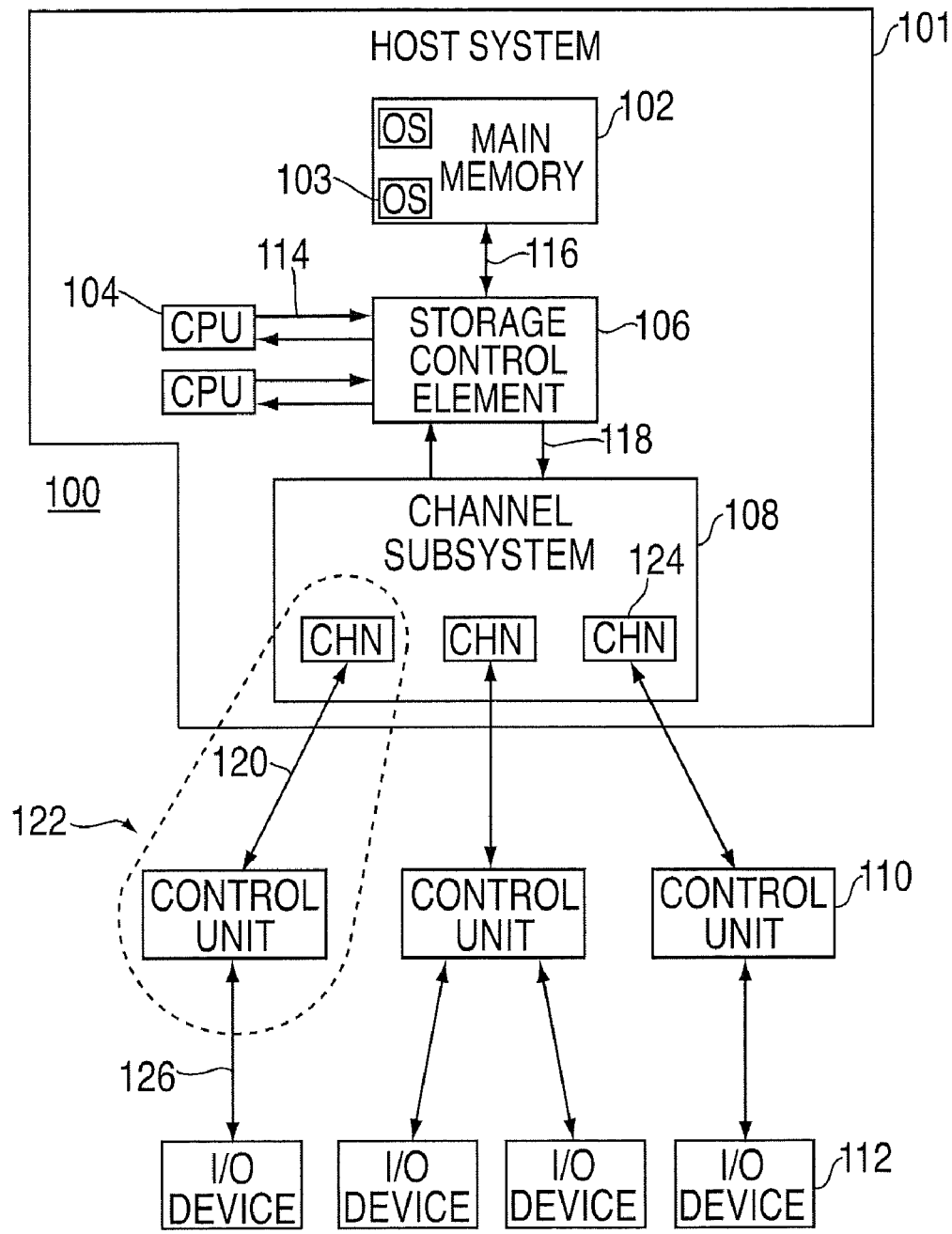
FIG. 1 depicts one embodiment of an I/O processing system incorporating and using one or more aspects of the present invention.

The detailed description explains the preferred embodiments of the invention, together with advantages and features, by way of example with reference to the drawings.

DETAILED DESCRIPTION OF THE INVENTION

In accordance with an aspect of the present invention, input/output (I/O) processing is facilitated. I/O processing is facilitated, in one example, by reducing communications between components of an I/O processing system used to perform the I/O processing. For instance, the number of exchanges and sequences between an I/O communications adapter, such as a channel, and a control unit is reduced. This is accomplished by sending a plurality of commands from the I/O communications adapter to the control unit as a single entity for execution by the control unit, and by the control unit sending the data resulting from the commands, if any, as a single entity.

The plurality of commands are included in a block, referred to herein as a transport command control block (TCCB), an address of which is specified in a transport control word (TCW). The TCW is sent from an operating system (OS) or other application to the I/O communications adapter, which in turn forwards the TCCB in a command message to the control unit for processing. The control unit processes each of the commands absent a tracking of status relative to those individual commands by the I/O communications adapter. The plurality of commands is also referred to as a channel program, which is parsed and executed on the control unit rather than the I/O communications adapter.

In an exemplary embodiment, the TCW for an I/O operation includes pointers indicating the location of the control data (e.g., the TCCB) and the customer data associated with the I/O operation. In an exemplary embodiment, the pointers refer to an indirect data address, referred to herein as a transport mode indirect data address list (TIDAL). The TIDAL includes a list of addresses where the data is located; these addresses are referred to herein as transport mode indirect data address words (TIDAWs). In the current system design with 4K pages the TIDAL cannot be larger than four kilobytes (4K), thus limiting the number of continuous TIDAWs that may be included in a single TIDAL to 256 (each TIDAL is 16 bytes). This limits the total amount of data that can be transferred by one I/O operation to one megabyte assuming 4K pages, each TIDAL is 16 bytes and the TIDAL has to be contained in one 4K page. In an exemplary embodiment of the present invention, this limitation is removed by allowing a TIDAW address to indicate the starting location of the next TIDAWs at another storage location which may be in a different page. A flag in the TIDAW is utilized to indicate whether the address of the TIDAW includes a data address or an address of the continuation of the TIDAW list. In this manner, TIDAWs making up a single TIDAL can be located in non-contiguous storage locations and thus, more than 256 TIDAWs can be included in a single TIDAL list. This allows more data to be transferred within a single I/O operation. For example, in an exemplary embodiment, where the count field in the TCW is four bytes, about four gigabytes (four gigabytes minus one byte) may be transferred within a single I/O operation.

One example of an I/O processing system incorporating and using one or more aspects of the present invention is described with reference to FIG. 1. I/O processing system 100 includes a host system 101, which further includes for instance, a main memory 102, one or more central processing units (CPUs) 104, a storage control element 106, and a channel subsystem 108. The host system 101 may be a large scale computing system, such as a mainframe or server. The I/O processing system 100 also includes one or more control units 110 and one or more I/O devices 112, each of which is described below.

Main memory 102 stores data and programs, which can be input from I/O devices 112. For example, the main memory 102 may include one or more operating systems (OSs) 103 that are executed by one or more of the CPUs 104. For example, one CPU 104 can execute a Linux® operating system 103 and a z/OS® operating system 103 as different virtual machine instances. The main memory 102 is directly addressable and provides for high-speed processing of data by the CPUs 104 and the channel subsystem 108.

CPU 104 is the controlling center of the I/O processing system 100. It contains sequencing and processing facilities for instruction execution, interruption action, timing functions, initial program loading, and other machine-related functions. CPU 104 is coupled to the storage control element 106 via a connection 114, such as a bidirectional or unidirectional bus.

Storage control element 106 is coupled to the main memory 102 via a connection 116, such as a bus; to CPUs 104 via connection 114; and to channel subsystem 108 via a connection 118. Storage control element 106 controls, for example, queuing and execution of requests made by CPU 104 and channel subsystem 108.

In an exemplary embodiment, channel subsystem 108 provides a communication interface between host system 101 and control units 110. Channel subsystem 108 is coupled to storage control element 106, as described above, and to each of the control units 110 via a connection 120, such as a serial link. Connection 120 may be implemented as an optical link, employing single-mode or multi-mode waveguides in a Fibre Channel fabric. Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch is coupled to a channel 124 and a control unit 110 and provides the capability of physically interconnecting any two links that are attached to the switch. In another example, it is also possible to have multiple systems, and therefore multiple channel subsystems (not depicted) attached to control unit 110.

Also located within channel subsystem 108 are subchannels (not shown). One subchannel is provided for and dedicated to each I/O device 112 accessible to a program through the channel subsystem 108. A subchannel (e.g., a data structure, such as a table) provides the logical appearance of a device to the program. Each subchannel provides information concerning the associated I/O device 112 and its attachment to channel subsystem 108. The subchannel also provides information concerning I/O operations and other functions involving the associated I/O device 112. The subchannel is the means by which channel subsystem 108 provides information about associated I/O devices 112 to CPUs 104, which obtain this information by executing I/O instructions.

Channel subsystem 108 is coupled to one or more control units 110. Each control unit 110 provides logic to operate and control one or more I/O devices 112 and adapts, through the use of common facilities, the characteristics of each I/O device 112 to the link interface provided by the channel 124. The common facilities provide for the execution of I/O operations, indications concerning the status of the I/O device 112 and control unit 110, control of the timing of data transfers over the channel path 122 and certain levels of I/O device 112 control.

Each control unit 110 is attached via a connection 126 (e.g., a bus) to one or more I/O devices 112. I/O devices 112 receive information or store information in main memory 102 and/or other memory. Examples of I/O devices 112 include card readers and punches, magnetic tape units, direct access storage devices, displays, keyboards, printers, pointing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

In one embodiment, to transfer data between I/O devices 112 and memory 102, channel command words (CCWs) are used. A CCW specifies the command to be executed, and includes other fields to control processing. One example of a CCW is described with reference to FIG. 2A. A CCW 200 includes, for instance, a command code 202 specifying the command to be executed (e.g., read, read backward, control, sense and write); a plurality of flags 204 used to control the I/O operation; for commands that specify the transfer of data, a count field 206 that specifies the number of bytes in the storage area designated by the CCW to be transferred; and a data address 208 that points to a location in main memory that includes data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

One or more CCWs arranged for sequential execution form a channel program, also referred to herein as a CCW channel program. The CCW channel program is set up by, for instance, an operating system, or other software. The software sets up the CCWs and obtains the addresses of memory assigned to the channel program. An example of a CCW channel program is described with reference to FIG. 2B. A CCW channel program 210 includes, for instance, a define extent CCW 212 that has a pointer 214 to a location in memory of define extent data 216 to be used with the define extent command. In this example, a transfer in channel (TIC) 218 follows the define extent command that refers the channel program to another area in memory (e.g., an application area) that includes one or more other CCWs, such as a locate record 217 that has a pointer 219 to locate record data 220, and one or more write CCWs 221. Each write CCW 220 has a pointer 222 to a data area 224. The data area includes an address to directly access the data or a list of data address words (e.g., MIDAWs or IDAWs) to indirectly access the data. Further, CCW channel program 210 includes a predetermined area in the channel subsystem defined by the device address called the subchannel for status 226 resulting from execution of the CCW channel program.

Figure 3:
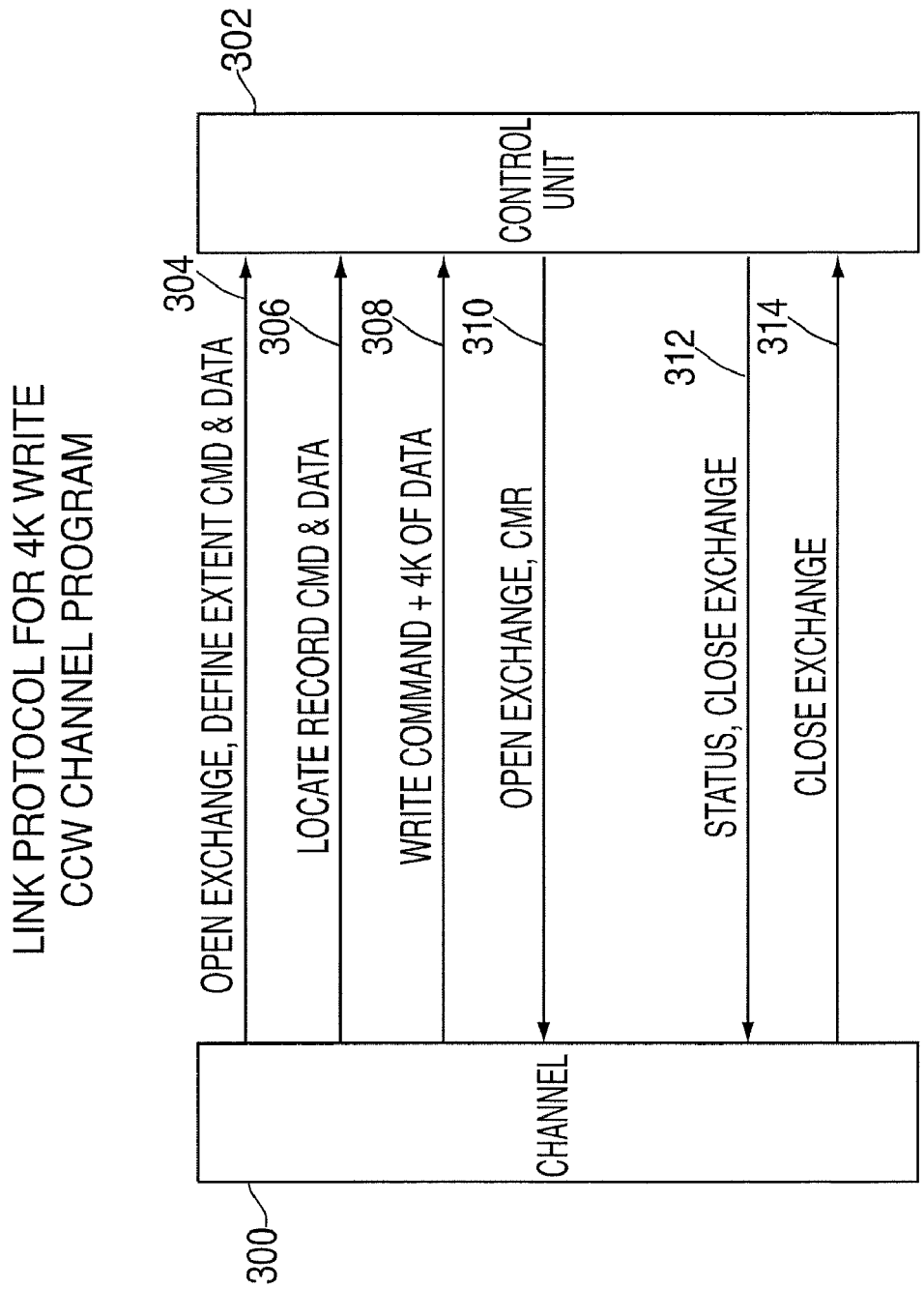
FIG. 3 depicts one embodiment of a prior art link protocol used in communicating between a channel and control unit to execute the channel command word channel program of FIG. 2B.

The processing of a CCW channel program is described with reference to FIG. 3, as well as with reference to FIG. 2B. In particular, FIG. 3 shows an example of the various exchanges and sequences that occur between a channel and a control unit when a CCW channel program is executing. The link protocol used for the communications is FICON (Fibre Connectivity), in this example. Information regarding FICON is described in "Fibre Channel Single Byte Command Code Sets-3 Mapping Protocol (FC-SB-3), T11/Project 1357-D/Rev. 1.6, INCITS (March 2003), which is hereby incorporated herein by reference in its entirety.

Referring to FIG. 3, a channel 300 opens an exchange with a control unit 302 and sends a define extent command and data associated therewith 304 to control unit 302. The command is fetched from define extent CCW 212 (FIG. 2B) and the data is obtained from define extent data area 216. The channel 300 uses TIC 218 to locate the locate record CCW and the write CCW. It fetches the locate record command and data 306 (FIG. 3) from the locate record CCW 217 (FIG. 2B) and locate record data 220. The write command and data 308 (FIG. 3) is fetched from write CCW 221 and data area 224 (FIG. 2B). Each is sent to the control unit 302.

The control unit 302 opens an exchange 310 with the channel 300, in response to the open exchange of the channel 300. This can occur before or after locate command and data 306 and/or write command and data 308. Along with the open exchange, a response (CMR) is forwarded to the channel 300. The CMR provides an indication to the channel 300 that the control unit 302 is active and operating.

The control unit 302 provides the status to the channel 300 and closes the exchange 312. In response thereto, the channel 300 stores the data, examines the status and closes the exchange 314, which indicates to the control unit 302 that the status has been received.

The processing of the above CCW channel program to write 4k of data requires two exchanges to be opened and closed and six sequences. The total number of exchanges and sequences between the channel and control unit is reduced through collapsing multiple commands of the channel program into a TCCB. The channel, e.g., channel 124 of FIG. 1, uses a TCW to identify the location of the TCCB, as well as locations for accessing and storing status and data associated with executing the channel program. The TCW is interpreted by the channel and is not sent or seen by the control unit.

One example of a channel program to write 4k of data, as in FIG. 2B, but includes a TCCB, instead of separate individual CCWs, is described with reference to FIG. 4. As shown, a channel program 400, referred to herein as a TCW channel program, includes a TCW 402 specifying a location in memory of a TCCB 404, as well as a location in memory of a data area 406 or a TIDAL 410 (i.e., a list of transport mode indirect data address words (TIDAWs), similar to MIDAWs) that points to data area 406, and a status area 408. TIDAW zero 412, TIDAW one 414 and TIDAW two 416 (collectively TIDAWs 412-416) can reference different locations in the data area 406 for acquiring or storing data. The TIDAWs 412-416 can reference non-contiguous blocks of data or contiguous blocks of data. The TIDAWs 412-416 in TIDAL 410 may be located sequentially in memory or located non-contiguously relative to each other. While only three TIDAWs 412-416 are depicted in TIDAL 410, it will be understood that any number of TIDAWs can be included in the TIDAL 410.

The processing of a TCW channel program is described with reference to FIG. 5. The link protocol used for these communications is, for instance, Fibre Channel Protocol (FCP). In particular, three phases of the FCP link protocol are used, allowing host bus adapters to be used that support FCP to perform data transfers controlled by CCWs. FCP and its phases are described further in "Information Technology—Fibre Channel Protocol for SCSI, Third Version (FCP-3)," T10 Project 1560-D, Revision 4, Sep. 13, 2005, which is hereby incorporated herein by reference in its entirety.

Figure 5:
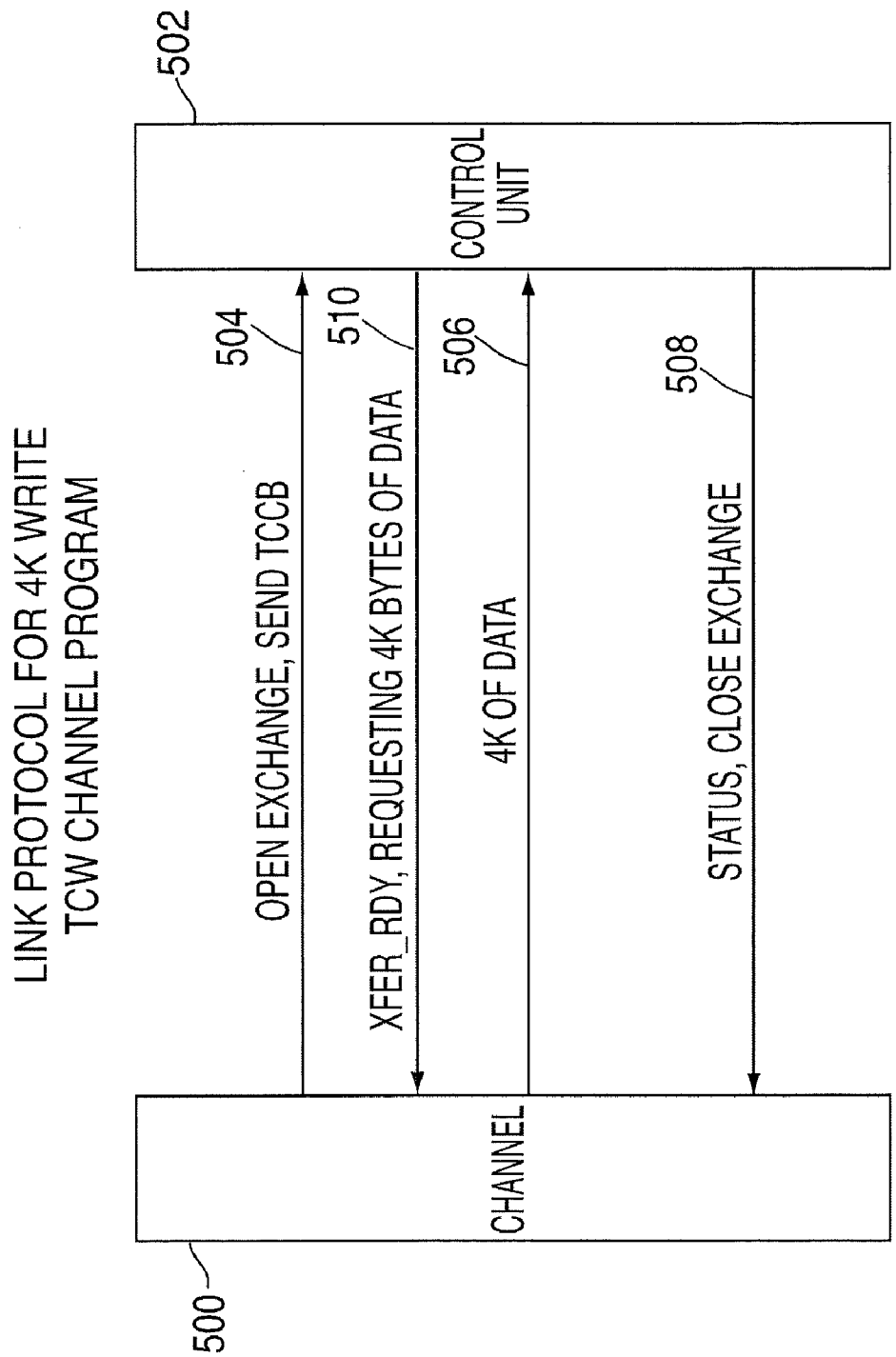
FIG. 5 depicts one embodiment of a link protocol used to communicate between a channel and control unit to execute the transport control word channel program of FIG. 4, in accordance with an aspect of the present invention.

Referring to FIG. 5, a channel 500 opens an exchange with a control unit 502 and sends TCCB 504 to the control unit 502. In one example, the TCCB 504 and sequence initiative are transferred to the control unit 502 in a FCP command, referred to as FCP_CMND information unit (IU) or a transport command IU. The control unit 502 transmits a transfer ready (XFER_RDY) IU 510 to the channel 500 when it is ready to receive data for the write commands received in the TCCB 504. In response to receiving the XFER_RDY IU 510, the channel 500 transfers the data 506 to the control unit 502, via, for instance, a FCP_Data IU. The control unit 502 executes the multiple commands of the TCCB 504 (e.g., define extent command, locate record command, write command as device control words (DCWs)) and writes the data 506 received from the channel 500. It also provides status and closes the exchange 508. As one example, final status is sent in a FCP status frame that has a bit active in, for instance, byte 10 or 11 of the payload of a FCP_RSP IU, also referred to as a transport response IU. The FCP_RSP IU payload may be used to transport FICON ending status along with additional status information.

The embodiment of the link protocol depicted in FIG. 5 is utilized when XFER_RDY is enabled. In the embodiment depicted in FIG. 5, the channel 500 cannot send the data 506 to the control unit 502 until it is requested by the control unit 502 via the XFER_RDY IU 510. In an alternate exemplary embodiment, XFER_RDY is disabled and the control unit does not transmit a XFER_RDY IU 510 to the channel 500. Thus, the channel 500 does not have to wait for the control unit 502 to request the data 506 before sending the data 506. This alternate embodiment, where XFER_RDY is disabled may be utilized when the channel 500 and the control unit 502 are located geographically far apart from each other (e.g., greater than twenty kilometers, greater than fifty kilometers) to improve performance. Unless otherwise specified, the discussion herein assumes that XFER_RDY is enabled.

In a further example, to write 4K of customer data, the channel 500 uses the FCP link protocol phases, as follows:

1. Transfer a TCCB in the FCP_CMND IU and sequence initiative to the control unit 502.
2. Wait for a XFER_RDY IU indicating that the control unit is ready to receive the data.
3. Transfer the IU of data, and sequence initiative to the control unit 502.
4. Final status is sent in a FCP status frame that has a bit active in, for instance, byte 10 or 11 of the FCP_RSP IU Payload. The FCP_RSP_INFO field or sense field is used to transport FICON ending status along with additional status information.

Figure 4:
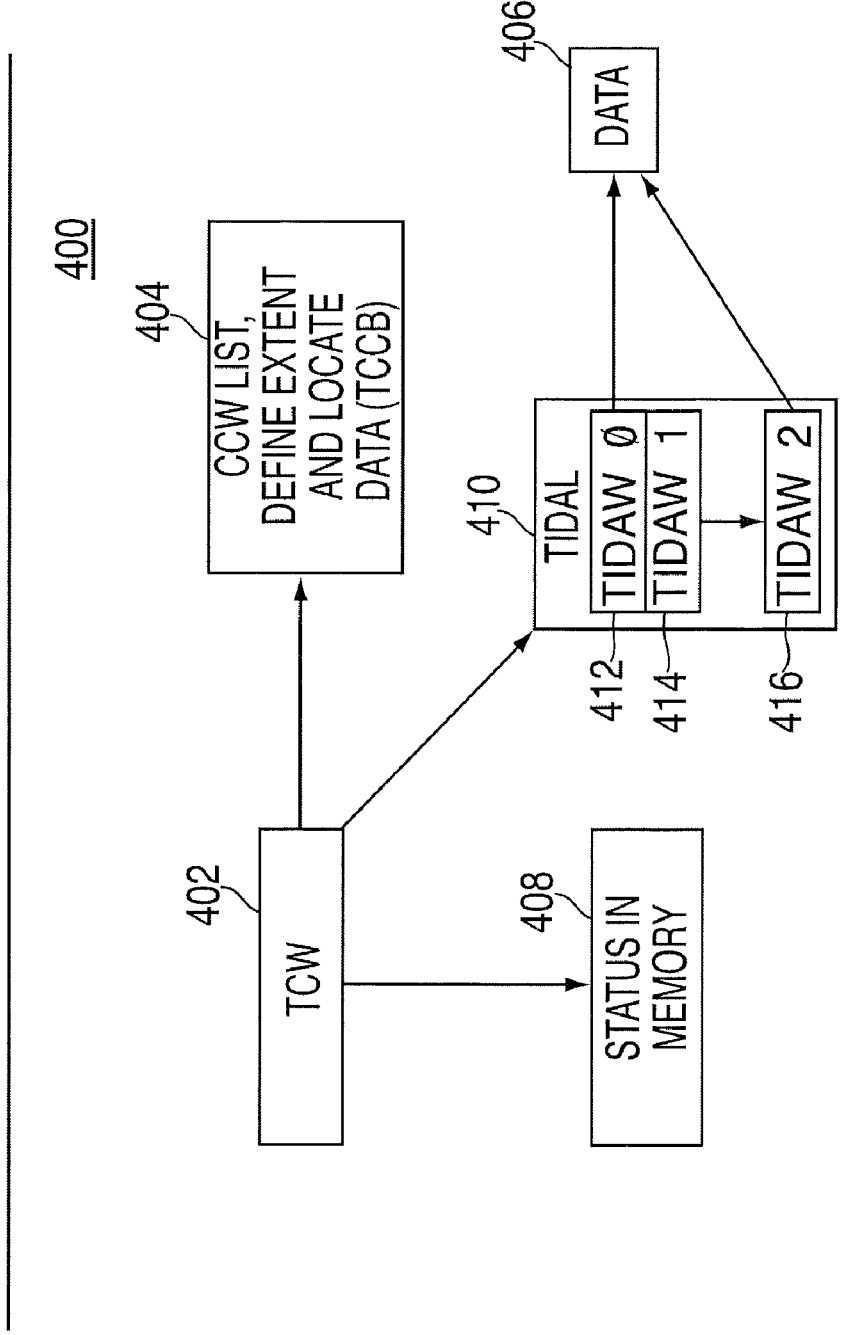
FIG. 4 depicts one embodiment of a transport control word channel program, in accordance with an aspect of the present invention.

By executing the TCW channel program of FIG. 4, there is only one exchange opened and closed (see also FIG. 5), instead of two exchanges for the CCW channel program of FIG. 2B (see also FIG. 3). Further, for the TCW channel program, there are four communication sequences (see FIGS. 4-5), as compared to six sequences for the CCW channel program (see FIGS. 2B-3).

Figure 6:
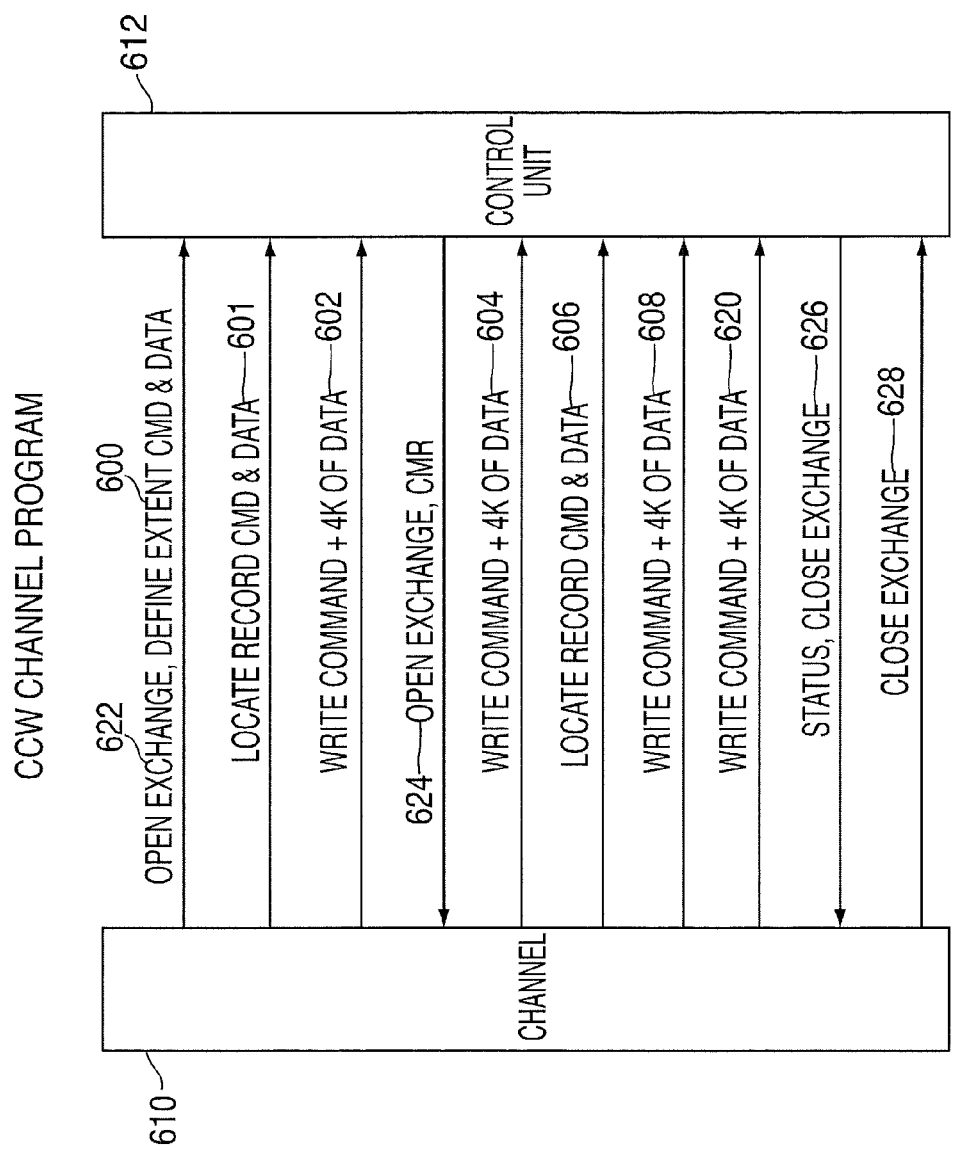
FIG. 6 depicts one embodiment of a prior art link protocol used to communicate between a channel and control unit in order to execute four write commands of a channel command word channel program.

The number of exchanges and sequences remain the same for a TCW channel program, even if additional commands are added to the program. Compare, for example, the communications of the CCW channel program of FIG. 6 with the communications of the TCW channel program of FIG. 7. In the CCW channel program of FIG. 6, each of the commands (e.g., define extent command and data 600, locate record command and data 601, write command and data 602, write command and data 604, locate record command and data 606, write command and data 608, and write command and data 620) are sent in separate sequences from channel 610 to control unit 612. This CCW channel program requires two exchanges to be opened and closed (e.g., open exchanges 622, 624 and close exchanges 626, 628), and ten communications sequences. This is compared to the four sequences and one exchange for the TCW channel program of FIG. 7, which accomplishes the same task as the CCW channel program of FIG. 6.

Figure 7:
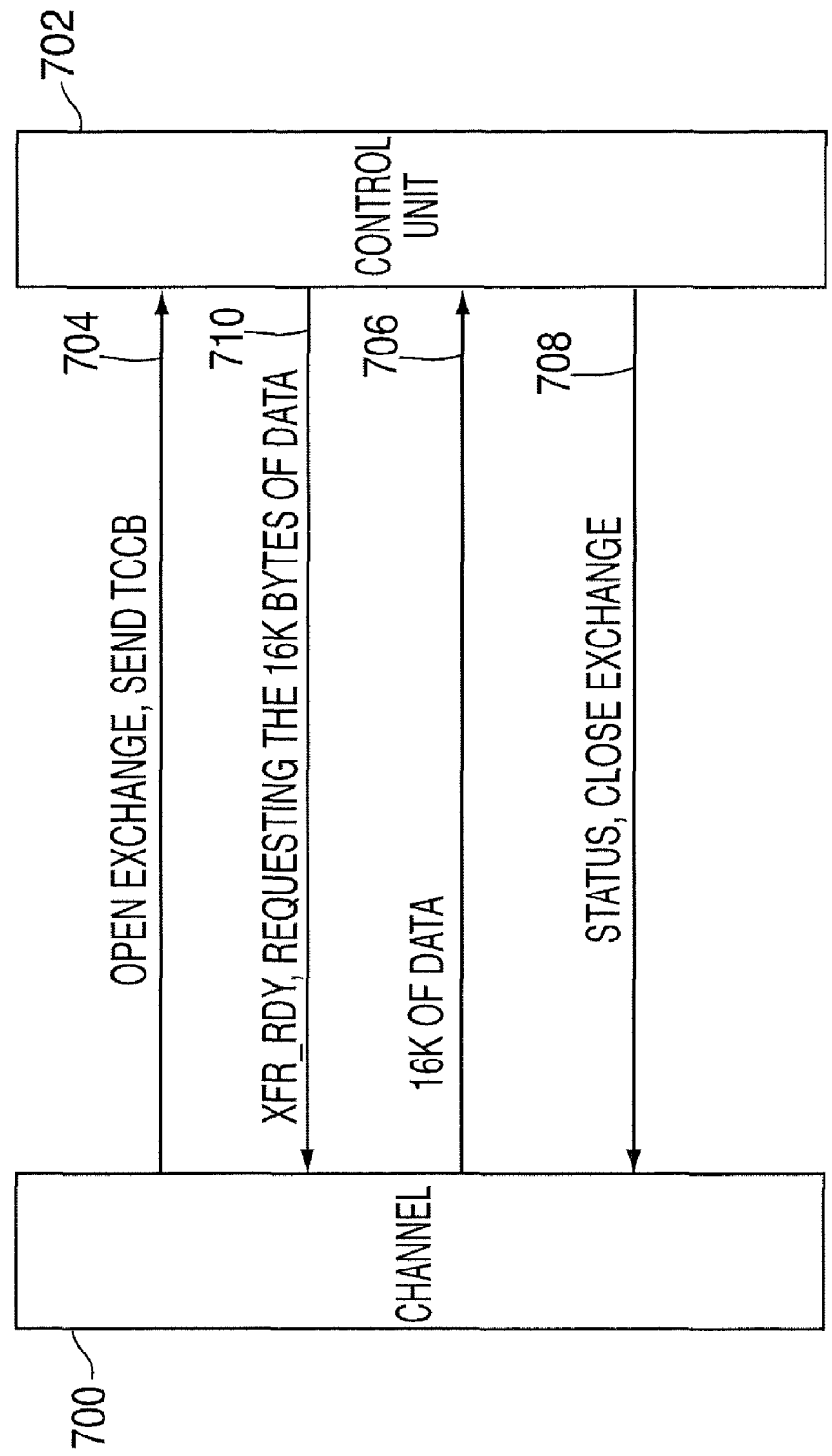
FIG. 7 depicts one embodiment of a link protocol used to communicate between a channel and control unit to process the four write commands of a transport control word channel program, in accordance with an aspect of the present invention.

As depicted in FIG. 7, a channel 700 opens an exchange with a control unit 702 and sends a TCCB 704 to the control unit 702. The TCCB 704 includes the define extent command, the two locate record commands, and the four write commands in DCWs, as described above. Similar to the example depicted in FIG. 5, the control unit 702 may use an XFER_RDY IU 710 to notify the channel 700 that it is ready receive data, provided that XFER_RDY support is not disabled. The channel 700 transmits 16k of data 706 to the control unit 702 in a single sequence upon receipt of the XFER_RDY IU 710. The channel 700 inserts a CRC every 4K of the 16k of data 706 in the sequence. The insertion of a CRC every 4K allows the control unit 702 to verify the 16K of data incrementally, rather than buffer the entire 16K for verification before completing the write commands in the TCCB 704. Additionally, the control unit 702 provides status to the channel 700 and closes the exchange 708. Thus, the TCW channel program of FIG. 7 requires much less communications to transfer the same amount of data as the CCW channel program of FIG. 6, while supporting incremental data verification via multiple CRC insertion in the output data stream from the channel 700.

Figure 8:
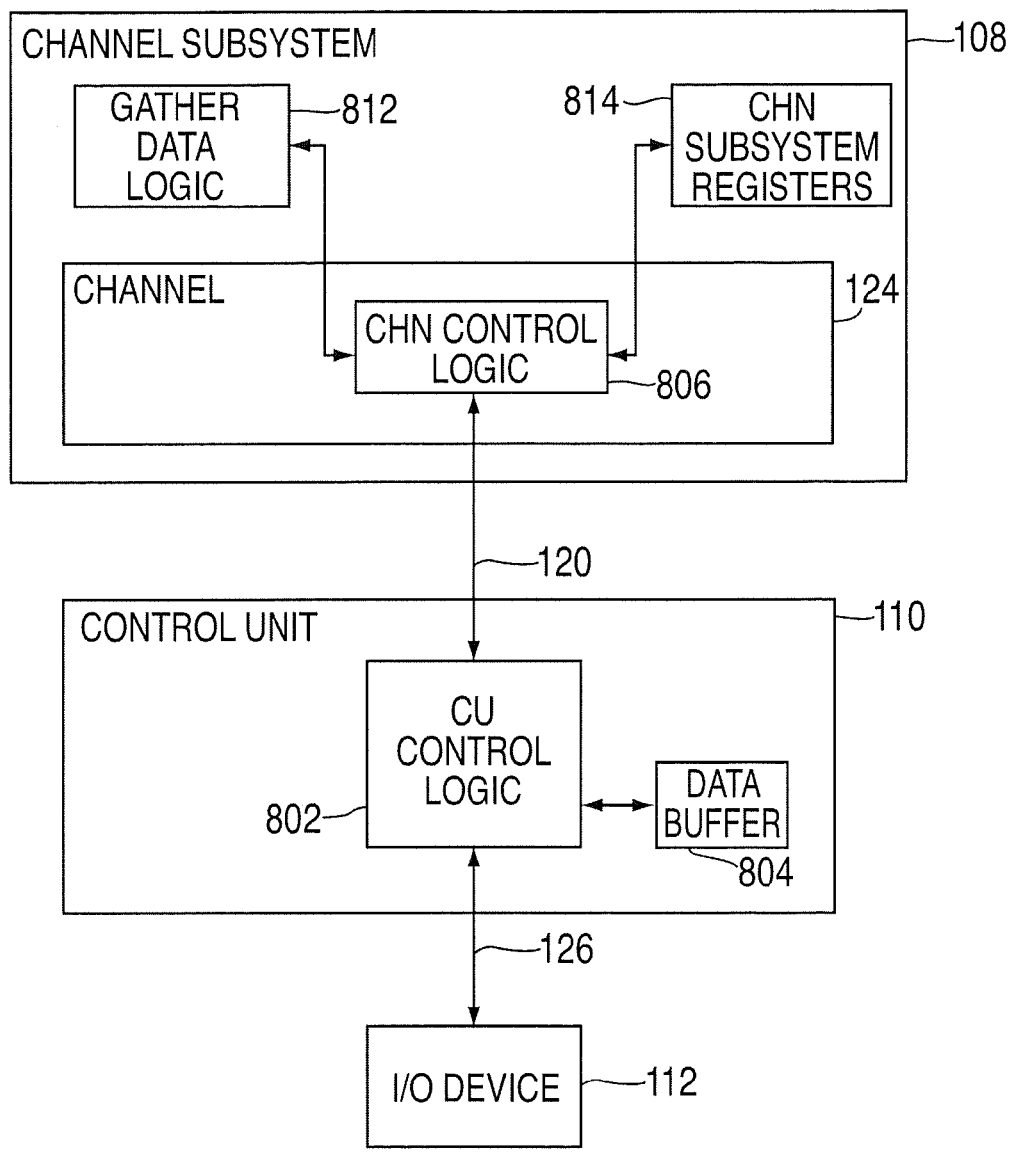
FIG. 8 depicts one embodiment of a control unit and a channel subsystem, in accordance with an aspect of the present invention.

Turning now to FIG. 8, one embodiment of channel 124 in the channel subsystem 108 and the control unit 110 of FIG. 1 that support TCW channel program execution are depicted in greater detail. The control unit 110 includes CU control logic 802 to parse and process messages containing a TCCB, such as the TCCB 704 of FIG. 7, as well as data received from the channel 124 via the connection 120. The CU control logic 802 can extract DCWs and control data from the TCCB received at the control unit 110 to control a device, for instance, I/O device 112 via connection 126. The CU control logic 802 sends device commands and data to the I/O device 112, and receives status information and other feedback from the I/O device 112. When the CU control logic 802 receives data, such as the first checking block boundary of the 16K bytes of data 706 of FIG. 7, the CU control logic 802 writes this data received into data buffer 804 for temporary storage, until the CRC is received for the checking block boundary is checked, then that data may be sent to the I/O device 112. This continues for each checking block boundary until the I/O operation is completed.

The control unit 110 may further include other queue or memory elements (not depicted) for storing additional message or status information associated with communications between the channel 124 and the I/O device 112.

The channel 124 in the channel subsystem 108 includes elements to support communication with the control unit 110. For example, the channel 124 may include CHN control logic 806 that interfaces with the gather data logic 812. The gather data logic 812 is described herein below in reference to FIG. 10. In an exemplary embodiment, the CHN control logic 806 controls communication between the channel subsystem 108 and the control unit 110. The CHN control logic 806 may directly interface to the CU control logic 802 via the connection 120 to send commands and receive responses, such as transport commands and response IUs. Alternatively, messaging interfaces and/or additional buffers (not depicted) can be placed between the CHN control logic 806 and the CU control logic 802. The CHN subsystem registers 814 can include fixed values that provide configuration and status information, as well as dynamic status information, updated as commands are transported and responses are received. The CHN subsystem registers 814 may be dedicated hardware registers and/or virtual registers established using memory mapping.

In one embodiment, the CHN subsystem registers 814 include the TIDAL 410 and TIDAWs 412-416 of FIG. 4 as memory mapped registers.

Figure 9:
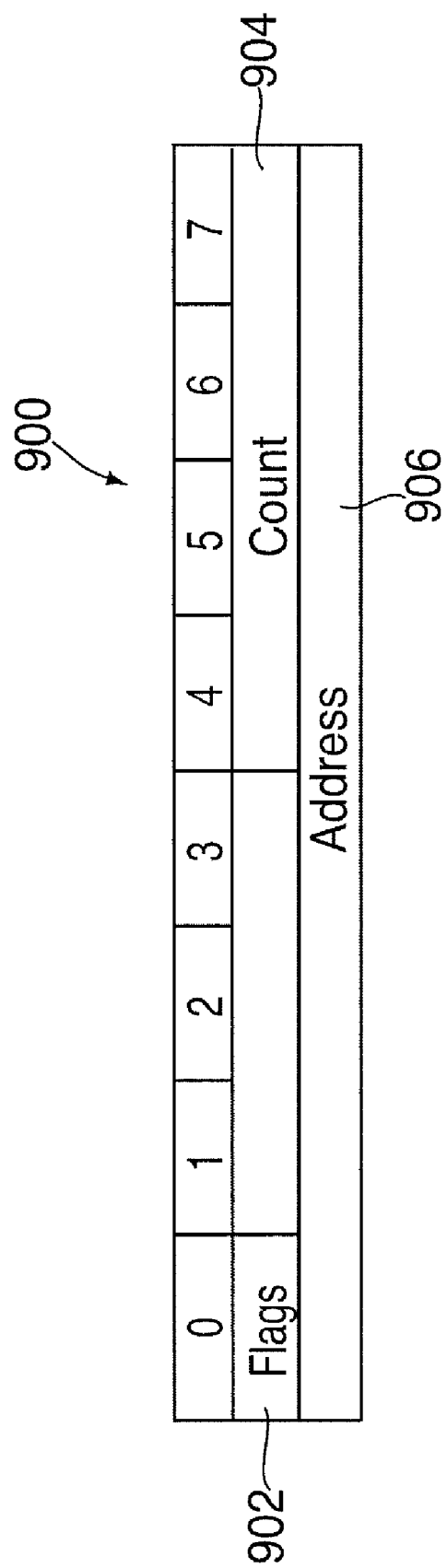
FIG. 9 depicts one embodiment of a transport mode indirect data address word (TIDAW), in accordance with an aspect of the present invention.

One example of a TIDAW 900 is depicted in FIG. 9. The TIDAW 900 provides indirect addressing to data used in a TCW channel program, such as the TIDAWs 412-416 of FIG. 4. The TIDAW 900 includes flags 902, a count 904, and an address 906. Each field (i.e., flags 902, count 904, and address 906) in the TIDAW format 900 is assigned to a particular byte address to support parsing of the fields. Although one arrangement of fields within the TIDAW 900 is depicted in FIG. 9, it will be understood that the order of fields can be rearranged to alternate orderings.

In an exemplary embodiment, the flags 902 include a last TIDAW flag and a transport-transfer in channel (T-TIC) flag, in addition to other flags. The last TIDAW flag indicates that the associated TIDAW is the last TIDAW in a TIDAL, consistent with the definition for a MIDAW. When count 904 goes to zero with the last TIDAW flag set, the data transfer for the associated I/O operation is complete. The T-TIC flag indicates whether the contents of the address 906 include data or the address of the next TIDAW in the TIDAL. In an exemplary embodiment, when the T-TIC flag is set, then the address 906 in the TIDAW is the address of the next TIDAW in the TIDAL. In the manner, the address 906 may be utilized to access a TIDAW at a non-contiguous storage location from the current TIDAW. Thus, the TIDAW list can contain more than 256 entries, thereby exceeding the maximum number of allowable indirect data address words in current implementations. In an exemplary embodiment, when the T-TIC flag is set the address 906 must have the four low order bits set to zero because the 16 byte TIDAW must be on a 16 byte address boundary. When the T-TIC flag is not set, then the address 906 in the TIDAW is the address of a portion of the data that makes up the data being gathered for the I/O operation. The size of the data is indicated in the count field 904. If the last TIDAW flag and the T-TIC flag are not set, then the next TIDAW is located in the next storage location (e.g., it is contiguous to the current TIDAW).

Figure 10:
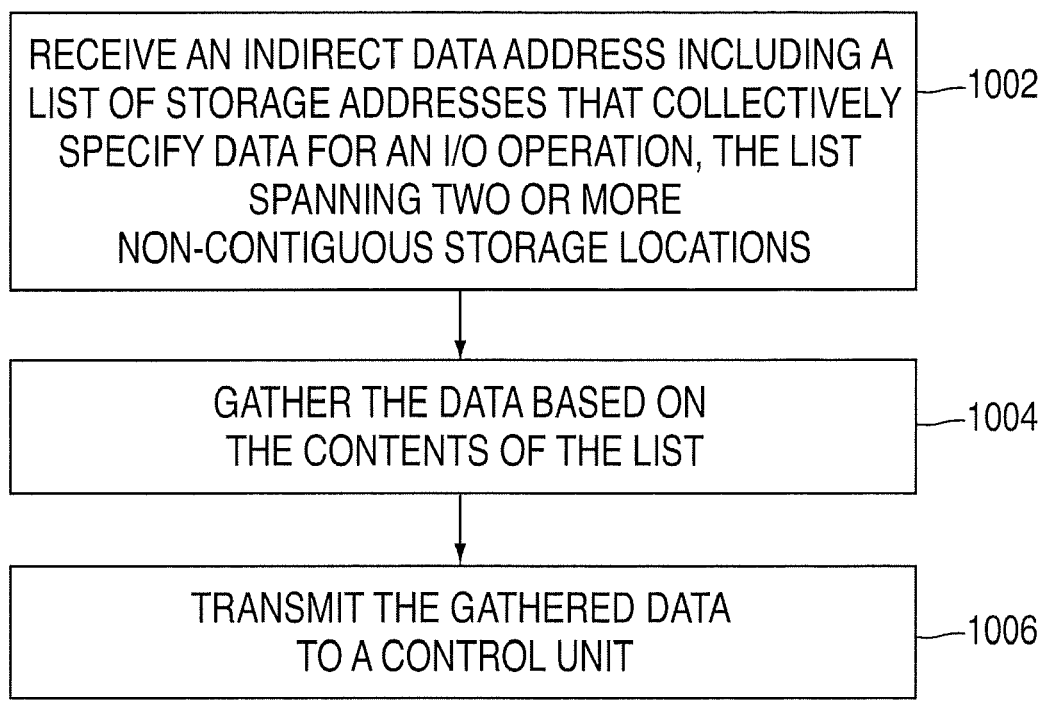
FIG. 10 depicts one embodiment of a process for providing non-contiguous indirect data addressing at an I/O subsystem.

Turning now to FIG. 10, a process 1000 for gathering data for an I/O operation will now be described in accordance with exemplary embodiments, and in reference to the I/O processing system 100 of FIG. 1. At block 1002, the channel subsystem 108 receives a control word for an I/O operation (e.g., a TCW). The control word includes an indirect data address that points to the starting address of a list of storage addresses (e.g., a TIDAL having multiple TIDAWs) that make up the data utilized by the by the I/O operation. In exemplary embodiments, the data is customer data (e.g., data input or output from the I/O operation). In alternate exemplary embodiments, the data is control data (e.g., a TCCB). In an exemplary embodiment, the list of storage addresses spans two or more non-contiguous storage locations.

At block 1004, the data is gathered by instructions located at the channel subsystem 108. The gathering is based on the contents of the list. In an exemplary embodiment, each entry in the list (e.g., each TIDAW) includes both a storage address and a T-TIC flag to indicate whether the storage address is the location of a portion of the data, or whether the storage address points to the location of another portion of the list containing more storage addresses. In this manner, a single TIDAL can be contained in multiple pages removing any restraints on the length of the TIDAL. When the T-TIC flag indicates that the storage address is the location of a portion of the data (e.g., the T-TIC flag is not set), then the data at the storage location is accessed and added to the data. This adding of new data can be performed in any manner known in the art, such as merging with data already gathered, appending to data already gathered, etc.

When the T-TIC flag indicates that the current storage address is the location of another portion of the list, then processing continues by accessing a new TIDAW located at the specified storage location. Data at the storage location specified in the new TIDAW is accessed and added to the data. In an exemplary embodiment, the TIDAW includes a count 904 to specify how much data to read (or write) from each storage address. When a TIDAW with the last TIDAW flag is set the gathering is completed. Otherwise, the next TIDAW is accessed and the data gathering continues.

At block 1006, the data is transmitted to a control unit 110 by the channel subsystem 108.

Technical effects of exemplary embodiments include providing non-contiguous indirect data addressing at a I/O subsystem. By allowing multiple 4k byte pages to contain the list of storage addresses (TIDAL) allows the number of TIDAWs to be unlimited, therefore more data can be associated with a single I/O operation. Large transfers of data can reduce communication overhead by avoiding additional handshaking and other delays associated with multiple smaller messages.

The following examples depict manners in which exemplary embodiments may be utilized to perform more than moving large blocks of data.

Exemplary embodiments may be utilized to aid in the prefixing of a channel program by an operating system. For example, when a channel program is passed to an operating system, the operating system may modify the channel program to add, replace, or modify command CCWs or DCWs. In an exemplary embodiment, this implies that a TCCB TIDAL will be created where the first TIDAW points to an area of storage containing the first part of the modified TCCB. The second TIDAW points to the remainder of the unmodified TCCB.

Exemplary embodiments may also be used to aid in the prefixing of channel programs by a hypervisor. If the hypervisor needs to modify the channel program, it would need to create a TIDAL with one more entry than the one passed by the guest. If the TIDAL passed by the guest is already the maximum size (256 TIDAWs), then the hypervisor can make its own modifications by creating a TCCB TIDAL that has two TIDAWs, one of which is the T-TICs to the first TIDAW of the TIDAL passed by the guest.

TIDAL T-TICs can also ease storage requirements for operating systems. If the channel program containing a TCCB TIDAL needs to be modified, it takes less storage to create a TIDAW and T-TIC than to allocated storage for the caller's TCCB TIDAL plus one more TIDAW.

Figure 11:
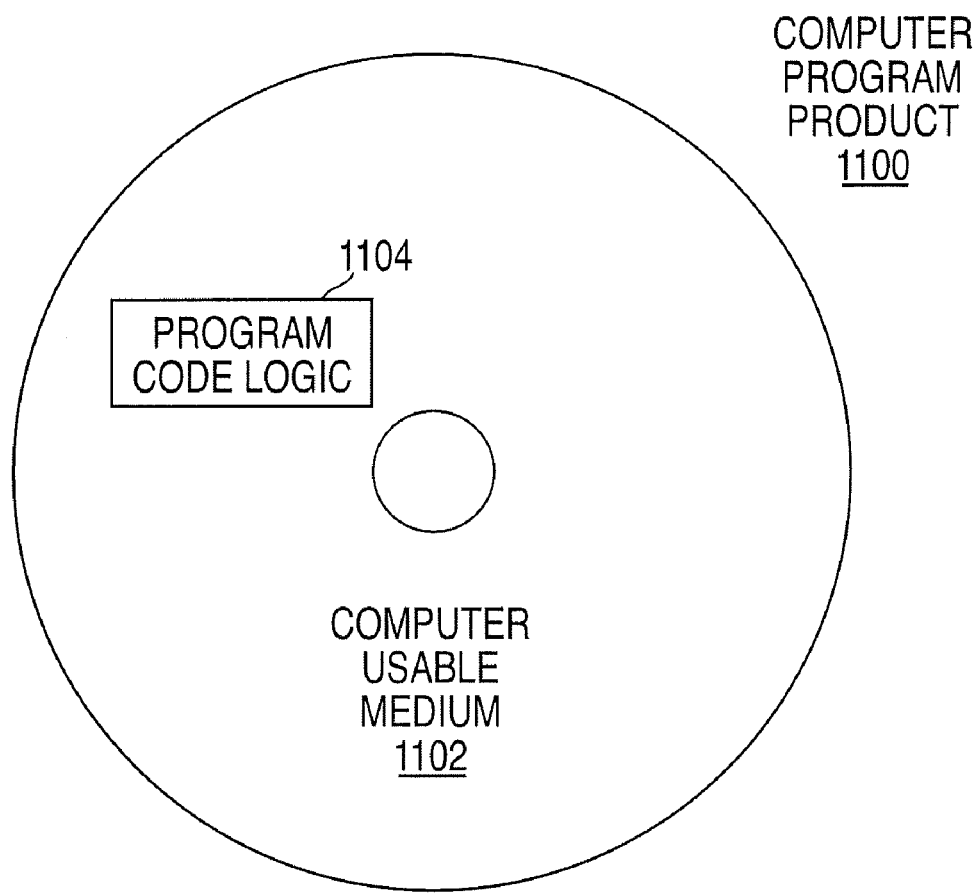
FIG. 11 depicts one embodiment of an article of manufacture incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a non-transitory computer program product 1100 as depicted in FIG. 11 on a computer usable medium 1102 with computer program code logic 1104 containing instructions embodied in a non-transitory tangible media as an article of manufacture. Exemplary articles of manufacture for computer usable medium 1102 may include floppy diskettes, CD-ROMs, hard drives, universal serial bus (USB) flash drives, or any other computer-readable storage medium, wherein, when the computer program code logic 1104 is loaded into and executed by a computer, the computer becomes an apparatus for practicing the invention. Embodiments include computer program code logic 1104, for example, whether stored in a storage medium, loaded into and/or executed by a computer, or transmitted over some transmission medium, such as over electrical wiring or cabling, through fiber optics, or via electromagnetic radiation, wherein, when the computer program code logic 1104 is loaded into and executed by a computer, the computer becomes an apparatus for practicing the invention. When implemented on a general-purpose microprocessor, the computer program code logic 1104 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A non-transitory computer program product for providing indirect data addressing at an input/output (I/O) subsystem of an I/O processing system, the computer program product comprising:

a non-transitory tangible storage medium readable by a processing circuit and storing instructions for execution by the processing circuit for performing a method comprising:

receiving a control word for an I/O operation, the control word including an indirect data address for data associated with the I/O operation, the indirect data address including a starting location of a list of storage addresses that collectively specify the data;

forwarding a transport command control block (TCCB) from the channel subsystem to a control unit controlling an I/O device for executing the I/O operation, the TCCB including at least one device control word (DCW) and the TCCB being obtained by a location identified by a transport control word (TCW);

gathering the data, wherein gathering comprises accessing entries of the list until a last entry is accessed, wherein accessing includes 1) and 2):

1) based on an entry of the list comprising a not-set first flag and a corresponding first storage address, gathering data from a corresponding storage location; and
2) based on an entry of the list comprising a set first flag and a corresponding second storage address, obtaining a next entry of the list from a second storage location, wherein the second storage address is located contiguously to the first storage address when an entry of the list comprises the not-set first flag, and the second storage address is located non-contiguously to the first storage address when an entry of the list comprises the set first flag; and
transmitting the gathered data to the control unit in the I/O processing system.

2. The non-transitory computer program product of claim 1, wherein the list of storage addresses includes transport mode indirect data address words (TIDAWs), the first storage address refers to a portion of the data and the second storage address refers to the second storage location where additional storage addresses in the list are located.

3. The non-transitory computer program product of claim 1, wherein for each storage address on the list, the gathering includes:
based on an entry of the list comprising the not-set first flag, adding contents from the first storage address to the data; and
based on an entry of the list comprising the set first flag, accessing the second storage address and a second flag located at the second storage address, and adding contents from the second storage address to the data based on the second flag being a not-set second flag.

4. The non-transitory computer program product of claim 1, wherein the list further includes a count field associated with each storage address in the list, the count field indicating a number of bytes to read from the storage address and the gathering is based on the count fields and to the storage addresses.

5. The non-transitory computer program product of claim 1, wherein the control word includes the TCW, and the list of storage addresses is a transport indirect data address list (TIDAL).

6. The non-transitory computer program product of claim 1, wherein the I/O subsystem is a channel subsystem.

7. The non-transitory computer program product of claim 1, wherein the control word includes a flag to indicate that it includes an indirect data address.

8. The non-transitory computer program product of claim 1, wherein the method further comprises, based on an entry of the list comprising a set last entry flag, determining that the entry is a last entry to be accessed.

9. The non-transitory computer program product of claim 1, wherein the data includes at least one of control data and customer data.

10. An apparatus for providing indirect data addressing at an I/O subsystem of an I/O processing system, the apparatus comprising:
an I/O subsystem configured for communication with a control unit in the I/O processing system, the I/O subsystem configured to perform a method comprising:
receiving a control word for an I/O operation, the control word including an indirect data address for data associated with the I/O operation, the indirect data address including a starting location of a list of storage addresses that collectively specify the data;
forwarding a transport command control block (TCCB) from the channel subsystem to the control unit controlling an I/O device for executing the I/O operation, the TCCB including at least one device control word (DCW) and the TCCB being obtained by a location identified by the TCW;
gathering the data, wherein gathering comprises accessing entries of the list until a last entry is accessed, wherein accessing includes 1) and 2):
1) based on an entry of the list comprising a not-set first flag and a corresponding first storage address, gathering data from a corresponding storage location; and
2) based on an entry of the list comprising a set first flag and a corresponding second storage address, obtaining a next entry of the list from a second storage location, wherein the second storage address is located contiguously to the first storage address when an entry of the list comprises the not-set first flag, and the second storage address is located non-contiguously to the first storage address when an entry of the list comprises the set first flag; and
transmitting the gathered data to the control unit.

11. The apparatus of claim 10, wherein the list of storage addresses includes transport mode indirect data address words (TIDAWs), the first storage address refers to a portion of the data and the second storage address refers to the second storage location where additional storage addresses in the list are located.

12. The apparatus of claim 10, wherein for each storage address on the list, the gathering includes:
based on an entry of the list comprising the not-set first flag, adding contents from the first storage address to the data; and
based on an entry of the list comprising the set first flag, accessing the second storage address and a second flag located at the second storage address, and adding contents from the second storage address to the data based on the second flag being a not-set second flag.

13. The apparatus of claim 10, wherein the list further includes a count field associated with each storage address in the list, the count field indicating a number of bytes to read from the storage address and the gathering is based on the count fields and to the storage addresses.

14. The apparatus of claim 10, wherein the data includes one or both of control data and customer data.

15. The apparatus of claim 10, wherein the I/O subsystem is a channel subsystem that is included in a host system, and an I/O communications adapter in the channel subsystem is configured to communicate with the control unit via a fibre channel network using a FICON protocol.

16. A method for providing indirect data addressing at an I/O subsystem of an I/O processing system, the method comprising:
receiving a control word for an I/O operation at the I/O subsystem, the control word including an indirect data address for data associated with the I/O operation, the indirect data address including a starting location of a list of storage addresses that collectively specify the data;
forwarding a transport command control block (TCCB) from the channel subsystem to a control unit controlling an I/O device for executing the I/O operation, the TCCB including at least one device control word (DCW) and the TCCB being obtained by a location identified by the TCW;
gathering the data, wherein gathering comprises accessing entries of the list until a last entry is accessed, wherein accessing includes 1) and 2):

1) based on an entry of the list comprising a not-set first flag and a corresponding first storage address, gathering data from a corresponding storage location; and
2) based on an entry of the list comprising a set first flag and a corresponding second storage address, obtaining a next entry of the list from a second storage location, wherein the second storage address is located contiguously to the first storage address when an entry of the list comprises the not-set first flag, and the second storage address is located non-contiguously to the first storage address when an entry of the list comprises the set first flag;

transmitting the gathered data to the control unit in the I/O processing system.

17. The method of claim 16, wherein the list of storage addresses includes transport mode indirect data address words (TIDAWs), the first storage address refers to a portion of the data and the second storage address refers to the storage location where additional storage addresses in the list are located.

18. The method of claim 16, wherein for each storage address on the list, the gathering includes:

based on an entry of the list comprising the not-set first flag, adding contents from the first storage address to the data; and based on an entry of the list comprising the set first flag, accessing the second storage address and a second flag located at the second storage address, and adding contents from the second storage address to the data based on the second flag being a not-set second flag.

19. The method of claim 16, wherein the list further includes a count field associated with each storage address in the list, the count field indicating a number of bytes to read from the storage address and the gathering is based on the count fields and to the storage addresses.

20. The method of claim 16, further comprising, based on an entry of the list comprising a set last entry flag, determining that the entry is a last entry to be accessed.

21. The method of claim 16, wherein the data includes at least one of control data and customer data.

22. The computer program product of claim 1, wherein the list includes a plurality of the entries, each of the plurality of the entries including a storage address and the flag.

23. The apparatus of claim 10, wherein the list includes a plurality of the entries, each of the plurality of the entries including a storage address and the flag.

24. The method of claim 16, wherein the list includes a plurality of the entries, each of the plurality of the entries including a storage address and the flag.

* * * * *